United States Patent
Connary et al.

(10) Patent No.: US 7,418,733 B2
(45) Date of Patent: Aug. 26, 2008

(54) DETERMINING THREAT LEVEL ASSOCIATED WITH NETWORK ACTIVITY

(75) Inventors: Iven Connary, Atlanta, GA (US); Darin J. Buck, Alpharetta, GA (US); Matthew F. Caldwell, Atlanta, GA (US); Robert T. Hughes, Warner Robins, GA (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 10/649,804

(22) Filed: Aug. 26, 2003

(65) Prior Publication Data

US 2004/0044912 A1 Mar. 4, 2004

Related U.S. Application Data

(60) Provisional application No. 60/405,921, filed on Aug. 26, 2002.

(51) Int. Cl.
 *G06F 11/00* (2006.01)
(52) U.S. Cl. ............... 726/25; 726/22; 713/188; 709/224
(58) Field of Classification Search .......... 726/22–27; 709/223–224
 See application file for complete search history.

(56) References Cited

U.S. PATENT DOCUMENTS

| | | | |
|---|---|---|---|
| 6,928,556 B2 * | 8/2005 | Black et al. ............ 726/6 |
| 7,089,428 B2 * | 8/2006 | Farley et al. .......... 726/22 |
| 7,152,105 B2 * | 12/2006 | McClure et al. ....... 709/224 |
| 2001/0039579 A1 | 11/2001 | Trcka et al. |
| 2002/0032871 A1 | 3/2002 | Malan et al. |
| 2002/0066034 A1 | 5/2002 | Schlossberg et al. |
| 2002/0107953 A1 | 8/2002 | Ontiveros et al. |
| 2002/0112185 A1 | 8/2002 | Hodges |
| 2003/0084349 A1 | 5/2003 | Friedrichs et al. |
| 2003/0177389 A1 | 9/2003 | Albert et al. |

OTHER PUBLICATIONS

Mukherjee, Biswanath et al., Network Intrusion Detection, IEEE Networth, May/Jun. 1994, pp. 26-41.

Ye, Nong, et al., Probabilistic Techniques for Intrusion Detection Based on Computer Audit Data, IEEE Transactions on Systems, Man, and Cybernetics—Part A: Systems and Humans, vol. 31, No. 4, Jul. 2001, pp. 266-274.

Erbacher, Robert F. et al., Intrusion and Misuse Detection in Large-Scale Systems, IEEE Computer Graphics and Applications, Jan./Feb. 2002, pp. 38-48.

* cited by examiner

*Primary Examiner*—Nasser Moazzami
*Assistant Examiner*—Fikremariam Yalew
(74) *Attorney, Agent, or Firm*—Seth H. Ostrow; Dreier LLP

(57) ABSTRACT

Network devices such as intrusion detection systems, routers, firewalls, servers, and other network devices are monitored to aggregate all event data generated by monitored devices to provide a threat ranking of all network activity. A threat level for a given host is determined by a threat weighting assigned to that host and a threat weighting assigned to that host's netblock. In addition, a vulnerability for a given event is determined by the event's destination threat associated with a vulnerability value indexed by the event's destination and the event's type.

8 Claims, 23 Drawing Sheets

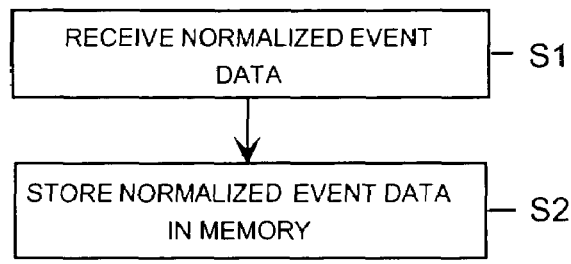
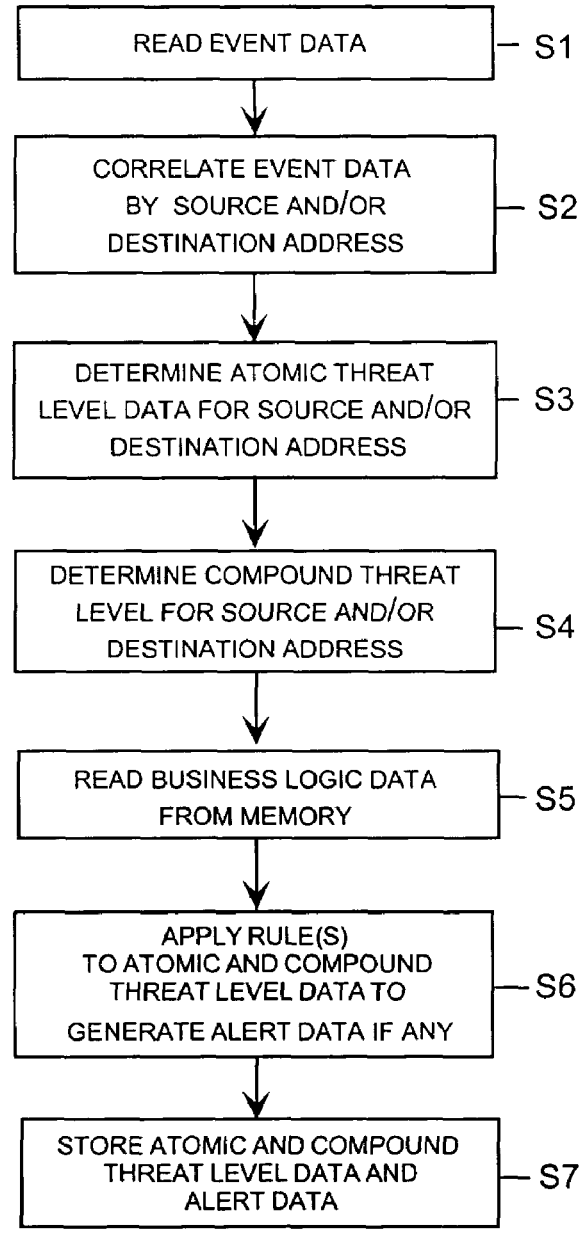

FIGURE 26

| ID | TIME | NAME | SENSOR_TYPE | PROTO | SRCIP | DSTIP | SRCPRT | DSTPRT |
|---|---|---|---|---|---|---|---|---|
| 49953... | 2001-11-26 1... | SF-10.0.0.1 | Checkpoint Fi... | 17 | 64.221.103.... | 64.221.103.... | 137 | 137 |
| ... | ... | ... | ... | ... | ... | ... | ... | ... |
| ... | ... | ... | ... | ... | ... | ... | ... | ... |
| ... | ... | ... | ... | ... | ... | ... | ... | ... |

| SRCTHREAT | DSTTHREAT | TYPE | INFO |
|---|---|---|---|
| 80000... | 80000... | reject | i/f_dire="inbound" i/f_mName="e... |
| ... | ... | ... | ... |
| ... | ... | ... | ... |
| ... | ... | ... | ... |

EXEMPLARY EVENT TYPES

ATTACKRESPONSES_403_FORBIDDEN
DDOS_MSTREAM_HANDLER_TO_CLIENT
FTP_BAD_LOGIN
MSSQL_WORM_PROPAGATION_ATTEMPT
SCAN_NMAP_TCP

EXEMPLARY EVENT TYPES

WEB:DOT-DOT
TCP-SWEEP
JOB:HOTJOBS
IIS:UNICODE
BACK-ORIFICE:SCAN

CALCULATIONS

190 THREAT
$$T(H) = TW[H] * NB\text{-}TW[NB[H]]$$

192 SOURCE THREAT
$$ST(e) = T(e.src)$$

194 DESTINATION THREAT
$$DT(e) = T(e.dst)$$

196 VULNERABILITY
$$DT(e) = T(e.dst)$$

198 EVENT VALIDITY
$$EV(e) = VALIDITY[e.src][e.type]$$

200 EVENT SEVERITY
$$ES(e) = PRIORITY[e]$$

202 ATOMIC THREAT LEVEL
$$AT(e) = EV(e) * V(e) * ST(e) * ES(e)$$

204 HOST THREAT LEVEL
$$\delta(e,H,t) = \begin{cases} 1 & \text{if } (e.src = H \text{ or } e.dst = H) \\ 0 & \text{otherwise} \end{cases}$$

$$HT(H,t) = \frac{\sum_{i=1}^{N} AT(e_i) * \delta(e_i,H,t)}{\sum_{i=1}^{N} \delta(e_i,H,t)}$$

206 DIFFERENTIAL THREAT LEVEL
$$DTL(H,T_1,T_1) = \frac{HT(H,T_1)}{HT(H,T_2)} * \frac{T_2}{T_1} \quad \text{WHERE } 0 < T_1 < T_2$$

FIGURE 33

DETERMINING THREAT LEVEL ASSOCIATED WITH NETWORK ACTIVITY

CROSS REFERENCE TO RELATED APPLICATIONS

This application claims priority benefit under 35 U.S.C. 119(e) to U.S. Provisional Application Ser. No. 60/405,921 filed on Aug. 26, 2002 titled "SYSTEM, APPARATUSES, METHODS AND ARTICLES FOR DETERMINING THREAT LEVEL ASSOCIATED WITH NETWORK," which is hereby incorporated by reference in the entirety and made part hereof.

FIELD OF THE INVENTION

The system, apparatuses, methods and articles of this invention can be used to determine whether network activity is the result of proper usage of network resources, or alternatively, is an attack from a network intruder. The system, apparatuses, methods and articles can be applied to present and report suspicious network activity to a person responsible for administering network security. In addition, the disclosed system, apparatuses, methods and articles can be used to maintain a forensic record or to generate a report documenting a network security incident or breach after the fact. Such information can be used by the network owner to evaluate a potential security weakness in a network. Moreover, such information may also be useful by the network owner and government authorities in the prosecution of a criminal attack.

BACKGROUND INFORMATION

There are numerous sensor products available on the market today that provide network event and security reporting. For example, many firewall, intrusion detection system (IDS), server, switch and router products have the capability to log and present network events to a network security administrator. In general, the network event log from such devices is non-standardized and unique to the product manufacturer. Therefore, there is no centralized presentation or reporting capability for these products. Instead, the network event record and any detected security alerts must be viewed with the user interface of each individual device hosting the product to determine the nature of any security incident. It would be desirable to provide a network security system, apparatuses, methods, and articles that provide the capability of accepting network event data from different sensors, and generating a uniform, integrated presentation from the event logs of multiple products. This would provide a network security administrator with a unified and readily comprehensible view of a network event or series of events that represent an attack on a network resource, even though the reported network events may originate from different types of sensors.

Although many firewalls, IDSs, servers, switches, routers or other sensors may have the capability to detect an event representing a possible security incident, there is no known effective way to rate the severity of a network attack. An 'attack' can be in the form of a network intrusion event, unauthorized access to or use of a network resource, damage or destruction of a network resource, or a denial-of-service attack. Regardless of the form of an attack, existing security products cannot generally rate the severity of an attack, particularly one involving multiple devices. For example, the destination of the attack may be a network resource that is particularly vulnerable to attack or whose impairment or loss would greatly impact the ability to use the network. Alternatively, a particular source of attack may pose a greater danger than others. For example, if the source of the attack is a person known to have attacked a network in the past, then the attack may be considered to be more severe than other attacks. It would be desirable to provide a system, apparatuses and methods that can rate an attack according to its severity.

In a network security system, numerous devices may be reporting security events or incidents. If numerous attacks are occurring simultaneously, the network security administrator must generally rely upon experience to determine the security events posing the greatest threats. It would be desirable to provide a system, apparatuses, methods, and articles that provide a more exact assessment of the comparative risk associated with network attacks relative to human reckoning. Using this capability of the system, apparatuses, methods and articles of the invention, an attack can be detected and assessed more quickly as to relative severity, allowing a network administrator to allocate security resources to those attacks most requiring attention.

With existing network security products, as previously mentioned, there is no integrated approach to evaluating or correlating events from different sensors to detect and generate an overall assessment of the threat level posed by a network attack or series of attacks. Moreover, there is no way to customize such an integrated network security system to reflect existing network realities to generate threat level data or alerts based upon criteria or rules set by the administrator. For example, if a network has only one web server with no back-up capability and many users are known to require access to the World Wide Web in the performance of their work functions, then a network administrator may rate an attack on the web server as particularly threatening. It would be desirable to provide a network security system, apparatuses, methods, and articles with the capability to adjust threat levels associated with certain attacks customized to the nature of the network and its devices in a particular implementation. Moreover, it would be desirable to permit the network administrator to set the threat level and/or logic resulting in generation of alerts associated with network events to provide automated detection of security incidents.

SUMMARY OF THE INVENTION

In their various embodiments, the disclosed system, apparatuses, methods, and articles overcome the disadvantages noted above with respect to previous technologies.

A system of the invention comprises a management module and at least one event module. In addition, the system can comprise at least one sensor. The sensor detects network events and records data regarding such events. For example, the event data can comprise the name or Internet protocol (IP) address of the sensor reporting the event, the type of sensor reporting the event, and/or the protocol (e.g., TCP/IP or UDP) used by the sensor. In addition, the event data can comprise source and destination IP addresses associated with the event, the source and destination ports used the source and destination devices if used in connection with the event, and/or the type of event (e.g., "Get" request, accept, reject, etc.). The event data can further include any additional information that may be reported by the sensor, which can vary significantly depending upon the particular sensor product generating the event data. The event module is coupled to the sensor to receive the event data therefrom. The event module can normalize the event data into a uniform format and can store this data for transmission to the management module. The event module can transmit the event data to the management module periodically after expiration of a determined time interval. Alternatively, the event module can transmit the event data to the management module once it stores a determined amount of event data. As yet another alternative, the event module can transmit the event data to the management module in response to a request signal from the management module.

The management module receives event data from at least one event module. The management module can timestamp the time and date of receipt of the event data. The time and date of receipt are considered to be an element of event data. In addition, the management module can generate and assign a unique identifier for each event record in the event data so as to be able to readily distinguish different events. The management module can store the received event data in its memory.

The management module uses the event data to determine threat level data. Threat level data can be either 'atomic' or 'compound.' 'Atomic' refers to threat level data that is calculated for only one event. 'Compound' refers to threat level data that can be calculated for more than one correlated event. The management module call calculate two different types of atomic threat level data, a 'source' atomic threat level and a 'destination' atomic threat level. The 'source' atomic threat level is determined based on a determined weight factor indicating a degree of threat posed by the source. For example, a source address known to be associated with a previous attack may pose a much greater degree of threat than a source address that corresponds to an employee of a company that also controls the resource designated by the destination address. In addition, the management module can calculate the source atomic threat level data based on the type of action involved in the event. For example, a request to delete a data file may pose a greater degree of threat as compared to a request to logon to a session with a resource associated with the destination address. The 'destination' atomic threat level data is computed based on a determined weight factor representing the vulnerability of the destination resource to attack. For example, a database server with no back-up capability that serves data needed by all employees of a company owning a network may be deemed highly critical by assigning it a relatively large weight factor. Conversely, an obsolete, seldom-used printer on a network may be assigned a relatively low weight factor. In addition, the 'destination' threat level data can be determined based on the type of action requested by the source of the destination resource. For example, a request to print a few pages of a document at a printer may be deemed less threatening than a request to reconfigure the printer. The threat level posed by the request action can be set accordingly to compute the destination threat level data. In the case of weight factors associated with source threat, destination vulnerability, and threat posed by action type for source or destination, such factors can be set by a network administrator or other user. Alternatively, such factors can be preset but user-modifiable values. Alternatively, such factors can be generated by a computer or other machine that is not a part of this invention.

The management module can calculate two compound threat level data for each source and destination associated with an event. These compound threat level data may be referred to as the 'frequency' and 'differential' threat level data. The 'frequency' threat level data is determined by summing the atomic threat level data over a first time period, and dividing by the number of events occurring in the first time period. This calculation can be performed for either or both the source and destination addresses, thus generating up to two 'frequency' threat level data values. The management module can calculate 'differential' threat level data by counting events occurring over the first time period and dividing by the first time period, to generate a first event frequency. The management module also calculates events occurring over a second time period greater than the first time period divided by the second time period, to generate a second event frequency. The management module determines the 'differential' threat level data by dividing the first event frequency by the second event frequency. The management module can perform these calculations for events involving the source and/or destination, so that up to two 'differential' threat level data values can be determined: one for the source, and one for the destination.

The management module can store the determined threat level data in its memory. The system can comprise a user interface unit coupled to the management module. The management module can use the determined threat level data and the event data to generate a threat presentation and/or report that is supplied to the user interface unit. The user interface unit presents the threat presentation and/or report to a user such as a network security administrator, to view the threat level data and event data. The user can utilize the presented threat level data and event data to determine whether an attack is in progress, as well as to decide upon countermeasures that should be taken to defeat an attack. In addition, the threat presentation and/or report may be useful in reporting a security incident to the network owner and/or law enforcement authorities. Furthermore, the threat presentation and/or report may be useful for forensic use as evidence in criminal prosecution of an attacker.

A first apparatus of the invention comprises a computing device including a processor and a memory. In addition, the computing device can comprise first and second interface units. The computing device can also comprise a bus coupling the processor, memory, and interface units together to permit communication between such elements. The memory stores an event module. The event module can comprise an event data processor module, an event database, an event sender, and an event module management processor module. The processor executes the event data processor module to receive and store event data. The event data indicates information concerning network activity, as previously mentioned. The processor executes the event data processor module to receive the event data via the first interface unit, and store such event data in the memory in the event database. The processor can execute the event data processor module to format the event data into a uniform format stored in the event database. The processor can execute the event sender module to transmit event data to a computing device hosting a management module that uses the event data to determine a threat level associated with an event. The processor can use the second interface unit to transmit event data to the computing device hosting the management module.

A second apparatus of the invention comprises a computing device including a processor and memory. The computing device can further comprise first and second interface units. The computing device can further comprise a bus for coupling the processor, memory, and first and second interface units to permit communication between such elements. The memory stores a management module. The management module can comprise an event storage module, a threat level determination module, a reporting module and a user interface module. The processor executes the event storage module to receive event data from a computing device hosting an event module via the first interface unit and bus, and to store the event data in the memory in a database. The processor executes the threat level determination module to generate threat level data based on the event data. More specifically, the processor can execute the threat level determination module to generate source and destination atomic threat level data for an event, and frequency and differential compound threat level data for both the source and destination address associated with one or more events. The processor can further execute the threat level determination module to apply rule(s) to threat level data. The rule(s) can be set by a network administrator as criteria for generation of an alert. The application of the rule(s) to the threat level data by the processor results in generation of alert data to indicate a possible attack against a network has occurred or is underway. The processor can execute the report module to generate a threat report concerning a network security incident, including the event data, threat level data and/or alert data associated with the incident. The processor can execute the report module to transmit the threat report to a user interface unit via the bus and second interface unit. In addition, the processor can execute the user interface module to provide a visual and/or audio presentation of the event data, threat level data, and/or any alert data generated by the processor. The processor can execute the user interface module to transmit the presentation to a user interface unit via the bus and second interface unit to generate a visual and/or audio presentation for a network security administrator or other user. In addition, the processor can supply the event data, threat level data, and/or alert data to an output unit for generation of a printed document or writing of such data onto a storage medium such as a CD-ROM, DVD, diskette, cassette, tape or other storage device.

The first method of the invention comprises receiving network event data from at least one sensor, normalizing the event data into a uniform format, and storing the normalized event data in a memory. The first method also comprises determining whether the event data is to be transmitted to a management module. If not, the preceding steps of the method can be repeated. Conversely, if the determination establishes that the event data is to be transmitted to the management module, the method comprises transmitting the normalized event data to the management module. The determination can be performed on the basis of different criteria. For example, the determination can be made on the basis of whether a request signal has been received from a management module. In addition, the determination can also be performed on the basis of whether an amount of data has been received from the sensor(s). As another possibility, the determination can be made on the basis of whether a time period has expired.

A second method of the invention can comprise reading event data. The second method comprises determining threat level data based on the event data. More specifically, the determining of threat level data can be performed to compute atomic threat level data. The atomic threat level data can be determined based on a source and/or destination address and the type of network activity indicated by the event data. Alternatively, or in addition to determining atomic threat level data, the second method can comprise correlating event data by source and/or destination address, and determining compound threat level data for the source and/or destination address based on the correlated event data. The method can comprise reading rule(s) from a memory and applying rule(s) to the atomic and/or compound threat level data. Depending upon the rule operation(s) and data and the value(s) of the threat level data, the application of rule(s) to the threat level data can result in generation of alert data. The third method can comprise generating a threat report and/or threat presentation including the threat level data and corresponding event data, and any alert data generated by application of the business logic to the threat level data. The resulting threat report and/or presentation can be transmitted to a user interface unit to render a presentation for a user such as a network administrator.

A first article of the invention is a computer-readable storage medium that stores the event module as previously described.

A second article of the invention is a computer-readable medium storing the management module as previously described.

A third article of the invention stores event data, threat level data, and alert data, possibly in the form of a threat report or threat presentation.

Details of the construction and operation of the invention are more fully hereinafter described and claimed. In the detailed description, reference is made to the accompanying drawings, forming a part of this disclosure, in which like numerals refer to like parts throughout the several views.

BRIEF DESCRIPTION OF THE DRAWINGS

FIG. 21 is a flowchart of a method performed by the event storage module of the management module;

FIG. 22 is a flowchart of a method performed by the threat level determination module to determine the threat level data and any alert data that may be generated by a network event, based on corresponding event data;

FIG. 26 is a view of a table of the database stored in the management module;

FIGS. 32A and 32B list some exemplary event types that are provided by commercially available sensor devices;

FIG. 33 presents exemplary formulas utilized in the determination of threat levels.

DESCRIPTION OF THE PREFERRED EMBODIMENTS

DEFINITIONS

Figure 1:
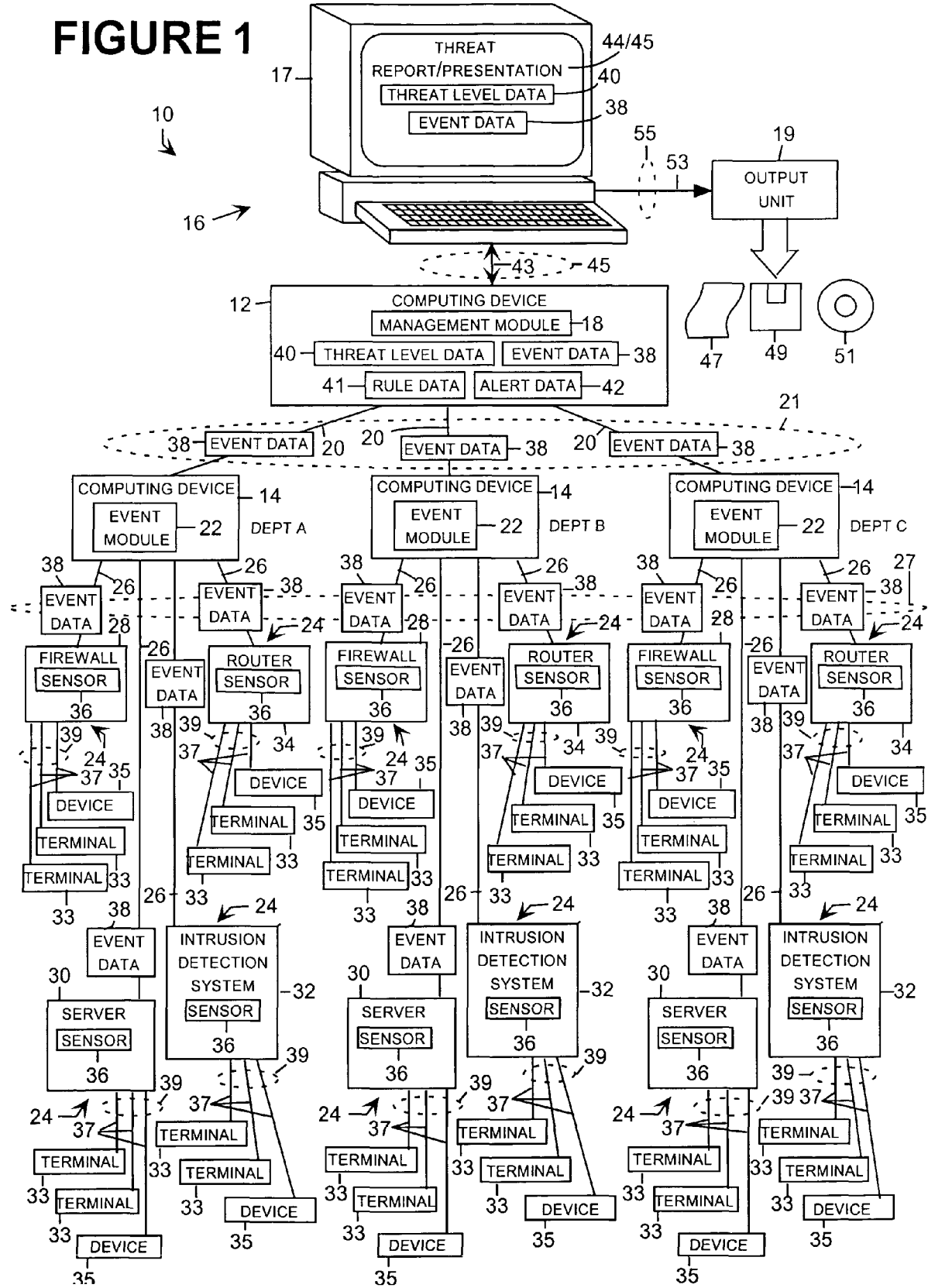
FIG. 1 is a block diagram of a system for sensing event data and generating threat level data and alert data based thereon.

"And/or" means either or both of the things preceding and succeeding the term.

"Attack" refers to an unauthorized act perpetrated on a network resource by an attacker. An attack can be in the form of obtaining unauthorized access or use of a network resource, sabotage or destruction of a network resource, or an act resulting in denial-of-service. More specifically, a network attack can be in the form of an attempt to gain unauthorized access of a network resource such as sensitive or confidential information or data. Alternatively, the attack may be in the form of an attempt to damage or destroy network resources. For example, this type of attack may involve transmission of certain types of viruses or worms into a computer network. Such viruses or worms are self-replicating and have the effect of consuming memory, and in the process erasing or overwriting computer programs or data, eventually resulting in a crash of the computer. In some situations, it may also be possible for the attacker to directly gain access to and damage or destroy computer programs, files, data or other network resources, such as by learning a user name and password to gain access to a network. Furthermore, the attack can be in the form of an action resulting in denial of service to network users, such as by consuming processing capacity of a network server or other hardware. For example, certain types of viruses can cause network connections to remain open, which has the effect of tying up network resources. Under this type of attack, the network hardware becomes unresponsive to network users because a significant amount of its data processing power is consumed due to the actions of the virus.

"Communication medium" refers to one or more transmission media through which an electronic, optical, or wireless signal can propagate. The communication medium can be a part of a telecommunications or wireless network, for example.

"Coupled" refers to joining a system, computing device, and/or memory so as to permit communication of data from one to another. Such data can be in electronic form and transmitted between coupled elements by a conductive line such as a wire or cable or other waveguide, or via wireless transmission of signals through air or other media, or space, for example. Alternatively, such data can be in optical form and transmitted via optical fiber or other optical waveguide, or by transmission of such optical signals through air, space, or other media, for example.

"Computer-readable medium" includes mechanical, electronic, magnetic, magneto-electronic, micro-mechanical, or optical data storage media, for example. The computer-readable medium can include compact-disk read-only memory (CD-ROM), digital versatile disk (DVD), magnetic media such as a floppy disk, diskette, cassette, hard disk storage units, tape or other data storage medium. The computer readable medium can include a random-access memory (RAM), read-only memory (ROM), programmable read-only memory (PROM), and/or electrically erasable read-only memory (EEPROM). The computer-readable medium can also include punch cards, magnetic strips, magnetic tapes, etc. Such memory can have a storage capacity from one bit to Terabytes or more, for example. The computer-readable medium can be loaded and executed by a computing device.

"Computing device" is a device capable of processing input data to generate output data through execution of computer code or instructions. Such computing device can be a super computer, mainframe, miniframe, server, personal computer, laptop computer, personal digital assistant (PDA), or other device. The computing device can also be capable of interacting with another computing device or memory to retrieve or store data. Options for the computing device hardware are commercially available from IBM® Corporation, Sun® Corporation, Santa Clara, Calif., Hewlett-Packard® corporation, Santa Clara, Calif., Dell® Corporation, Roundrock, Tex., Compaq® Corporation, and many other sources. Computing devices normally include Basic Input/Output System (BIOS) which contains code to identify to the computing device's processor what hardware elements (e.g., keyboard, disk drives or other memory, display screen, serial communications, etc.) are accessible to the processor and how to interact with such elements. Computing devices normally also include an operating system to perform basic tasks such as recognizing input from a keyboard, mouse or other input device, sending output to a display screen, keeping track of files and directories of files stored on a disk, and controlling peripheral devices such as disk drives and printers. Possible operating systems include DOS, UNIX, LINUX, Solaris, Apache, or OS, AS/400, S/390, zSeries, or iSeries systems from IBM® Corporation, for example. The computing device can communicate with other devices in a network via Ethernet or token-ring protocols and interface cards. The computing device can also communicate with another device or resource over the World Wide Web of the Internet using transfer control protocol/internet protocol (TCP/IP), User Datagram Protocol (UDP), file transfer protocol (FTP) or other protocol. The computing device can be configured to encode and/or decode a datastream for transmission or reception via a network using Ethernet, HTTP, HTML, XML, WML, WAP, in accordance with the specifications of respective layers of the IEEE 802.x standards of the ISO/OSI reference model, for example.

"Memory" refers to a device capable of storing data, such as a random-access memory, hard disk drive(s), tape or other storage medium type for the storage of data. The memory can be implemented as multi-hard-disk storage drive coupled to a database server. For example, the memory can be controlled with commercially available software packages such as Oracle 9i from Oracle® Corporation, Redwood City, Calif. The computing device can communicate with the memory through an application program interface (API) such as Java DataBase Connectivity (JDBC) or Open DataBase Connectivity (ODBC), for example. Alternatively, the memory can be a random-access memory (RAM), read-only memory (ROM), programmable read-only memory (PROM), and/or electrically erasable read-only memory (EEPROM).

"Graphical user interface" or "GUI" refers to an interface provided by a computing device that permits a person to interact with and/or control the computing device. The GUI can be used to present a threat report or presentation to a network security administrator, for example.

"Interface unit" is a device that interfaces a computing device with at least one other device, optionally via a network. The interface unit can be a network interface card (NIC) or other such device, for example.

"Input device" refers to a keyboard, mouse, joystick, wand or any other device that can be operated by a user to input commands or data into the computing device.

"Instruction" refers to computer code that is executable by a processor of a computing device.

"Module" refers to computer code such as a program, object, applet, script or servlet executable by a processor of a computing device.

"Network device" is a device such as a web server, database server, database storage unit, printer, or other device used in a network.

"Network resource" refers to data, a computer program, a file, and/or a hardware device accessible by a computing device via a network.

"Network" can be an intranet, local area network (LAN), wide area network (WAN), metropolitan area network (MAN), the Internet, a virtual private network (VPN), or other network, for example. The "network" establishes communication between two or more computing devices. Such network communication can be in accordance with the specifications of IEEE 802.x relating to the ISO/OSI reference model.

"Operating system" is a computer program that enables a processor within computing device to perform basic tasks using other elements of the computing device, such as the memory, user interface unit for generating a visual display or audio output, input device such as a keyboard or mouse, and/or an output peripheral device such as a printer or hard disk drive, etc. Such operating systems can include Microsoft® Windows XP, Windows 2000™, Windows NT™, Windows 98™, Windows 95™, or disc-operating system (DOS), for example. Such operating systems can also include Java-based Solaris® by Sun Microsystems, Inc., UNIX®, LINUX®, CISCO®, RealSecure®, Apache®, OS, AS/400, S/390, zSeries, iSeries, and other operating systems.

"Output unit" can comprise a printer for producing a document including a threat report and/or threat presentation. "Output unit" can also comprise a hard disk drive with read/write capability for producing a document or disk including a threat report and/or threat presentation.

"User interface unit" can comprise a flat-panel transistor display, a liquid crystal display (LCD), a cathode ray tube (CRT), projection system and/or other device for generating a display based on event data, threat level data and/or alert data generated by a computing device. In addition to the display unit, or as an alternative thereto, the user interface unit can comprise one or more acoustic speakers or other sonic device for generating sound based on event data, threat level data and/or alert data. Furthermore, the user interface unit can also output event data, threat level data and/or alert data in any human or machine perceptible form.

"Platform" is synonymous with "operating system." "Processor" can be a microprocessor such as a Pentium® series microprocessor commercially-available from Intel® Corporation or an Athlon®, Duron® or K6®-2 microprocessor commercially available from Advanced Micro Devices, Inc., a microcontroller, programmable instruction array (PLA), field programmable gate array (FPGA), programmable instruction device (PLD), programmed array instruction (PAL), or other device. In some instances, "processor" refers to a software module executed by a computing device to process data, such as the event data processor, event module management processor, threat level processor, reports processor, and interface processor.

"Rule" is computer instruction, logic and/or data that operates on threat level data to determine whether alert data is to be generated to indicate that an attack is underway or has occurred.

"Server" is one example of a computing device operating on the Internet or other network environment that responds to commands from a client. Such server can be commercially available from numerous sources such as Alpha Microsystems®, Santa Ana, Calif., Intel® Corporation, Hewlett-Packard® Corporation, Sun Microsystems®, Inc. The server can be capable of serving data or files to client applications such as browsers via hypertext transport protocol (HTTP), for example. The server can execute server-based applications such as CGI scripts, or Java® servlets, or Active server pages, for example.

"(s)" at the end of a word means "one or more." For example, "resource(s)" means "one or more resources."

"Terminal" can be a computing device, work station, or a terminal with no or limited data processing capability, that permits a human user to interact with other devices or resources of a network.

"Transmission media" includes an optical fiber, wire, cable, air, space, or other media for transmitting data in optical, electric, or wireless form.

"Universal Resource Locator" or "URL" is the address of a device such as a computing device accessible via the Internet or other network.

"User" generally refers to a human or machine operator of a computing device, such as a network security administrator.

"Web browser" or "browser" is a computer program that has the capability to execute and display an HTML and/or extensible mark-up language (XML) document, for example, and that interacts with the computing device via a network. For example, the web browser can be Internet Explorer® version 6 or higher program available from Microsoft® Corporation, Redmond, Wash., or Communicator® version 6.2 or higher program available from Netscape, Inc. "Web browser" also encompasses within its meaning HTML and/or XML viewers such as those used for personal digital assistants (PDAs).

General System and Method

In FIG. 1, a system 10 of this disclosure generally comprises a computing device 12. In addition, the system 10 can comprise at least one additional computing device 14 and an user interface unit 16. The computing device 12 is loaded with a management module 18 that controls several important functions of the system 10, as will be described in further detail hereinafter. The computing device 12 is operatively coupled in communication with computing devices 14 via respective communication media 20. The communication media 20 can be a part of a network 21 or alternatively can be stand-alone lines. In the example of FIG. 1, three computing devices 14 are shown, one for each of Departments A, B and C of an organization. The computing devices 14 are loaded with respective event modules 22. The computing devices 14 are coupled to respective sensor devices 24 via respective communication media 26. More specifically, the sensor devices 24 can comprise one or more of a firewall 28, a server 30, an intrusion detection system (IDS) 32, and/or a router 34, coupled via respective lines 26 to the computing device 14. The sensor devices 24 can in turn be coupled to respective terminals 33 and/or network devices 35 via communication media 37. The communication media 37 can be a part of respective networks 39 such as intranetworks or can be communication media separate from any network. The sensor devices 24 are loaded with respective sensors 36 that detect events occurring at such devices or within the terminals 33, network devices 35 and/or networks 39 that are monitored by such network devices. Such events include requests to access, use, update, modify or delete network devices or resources coupled to these devices or accessible via these devices. The sensors 36 of the respective devices 24 generate event data that includes: (1) event type data that identifies the nature of the event that occurred (e.g., HTTP "GET" request, accept, reject, 404 file not found, etc.); (2) source identification data indicating the source of the event, such as the source Internet protocol (IP) address and the source port of the device originating the event; (3) destination identification data indicating the destination associated with the event, such as the destination IP address and destination port used by the device involved with the event; (4) timestamp data indicating the date and time of the event in the frame of reference of the sensor; (5) data identifying the sensor reporting the event data such as the sensor name and type; (6) data identifying the protocol used by the sensor reporting the event data; and (7) other data that depends upon the type of sensor used by the device. The sensor devices 24 transmit respective event data 38 to the event module 22 via respective communication media 26. The communication media 26 can be part of network 27 which may be the Internet, for example, or can be separate stand-alone or dedicated media.

The event module 22 is executed by its computing device 14 to collect and timestamp event data generated by the devices 24. The timestamp applied by the event module 22 rather than that applied by the reporting sensor is preferred for use in determination of compound threat level data. The event module 22 is also executed by the computing device 14 to concert the data into a uniform format. In addition, the event module 22 can be executed by the computing device 14 to store the collected event data in the event module 22 of the computing device 14. In response to a request signal from the computing device 12, or alternatively at periodic or irregular time intervals, the computing device 14 can transmit event data 38 to the computing device 12 via respective communication media 20.

The management module 18 is executed by the computing device 12 to receive event data 38 from the computing device 14 and to store the event data 38 in its management module 18. The computing device 12 executes the management module 18 to generate threat level data 40 based on the event data 38. More specifically, the computing device 12 can determine threat level data 40 based on the source and/or destination address indicated by the event data 38. Determining the threat level data for both the source and destination address associated with an event is generally advantageous from the standpoint of permitting attacks directed to different resources originating from a single source or attacks to the same destination to be readily detected. Because many attacks involve one of these two circumstances, threat level determination on the basis of both source and destination is generally highly probative of an attack. Threat level data that is determined on the basis of a single event is termed an 'atomic' threat level. The computing device 12 executes the management module 18 using the event data 38 to determine atomic threat level data 40 for the source and/or destination address associated with an event. Threat level data 40 that is determined on the basis of potentially more than one event is termed 'compound' threat level data. Compound threat level data can be determined for either or both of the source and destination addresses associated with an event. As previously stated, it is generally advantageous to determine compound threat level data 40 for both the source and destination addresses involved with an event because it is common for attacks to originate from a single source address and/or be targeted to a single resource. To determine compound threat level data 40, the management module 18 can be executed by the computing device 12 to correlate event data 38. In general, correlation of event data 38 is performed by the management module 18 by determining event data. that is associated with the same. source and/or destination address. The atomic threat level data for the correlated event data 38 can be summed by the computing device 12 executing the management module 18 over a first time period, and divided by the number of events occurring in the first time period, to produce a form of compound threat level data termed 'frequency' threat level data 40. The 'frequency' threat level data can be determined for either or both the source and destination addresses associated with the event data 38. In addition, the management module 18 is executed by the computing device 12 to sum correlated events occurring over the first time period, and to divide the resulting sum by the first time period, to produce first event frequency data. The management module 18 is executed by the computing device 12 to sum correlated events occurring over a second time period greater than the first time period, and to divide the resulting sum by the second time period, to produce second event frequency data. The first event frequency data is divided by the second event frequency data to produce 'differential' threat level data 40. The differential threat level data can be determined on the basis of event data for either the source or destination address, or both. Hence, threat level data 40 can comprise as many as six values, namely, those associated with: (1) source atomic threat level data; (2) destination atomic threat level data; (3) source frequency compound threat level data; (4) destination frequency compound threat level data; (5) source differential compound threat level data; and (6) destination differential compound threat level data. Furthermore, the computing device 12 can execute the management module 18 to retrieve one or more rules from its memory for application to one or more values or combination of values of the threat level data. For example, the rule(s) 41 can include AND, OR, NOT or other Boolean operations or mathematical functions and data applied to the threat level data values, to determine whether an attack or potential attack has occurred or is underway. As an example, rule(s) 41 may be defined to cause the computing device 12 to sum the threat levels for all six threat level data values and compare the sum with a threshold value. If the sum is greater than the threshold value, then the computing device 12 can activate an alert flag to indicate to the user that an attack is underway. Conversely, if the sum is less than or equal to the threshold value, then the computing device 12 can deactivate the alert flag to indicate that no attack is underway. The rule(s) 41 can be predefined or may be set by a machine or a user such as a network administrator. To summarize, the result of the application of the rule(s) 41 to the threat level data 40 can produce an alert to notify a user such as a network security administrator of the occurrence of a possible security incident.

The computing device 12 is coupled to the user interface unit 16 via communication medium 43. The communication medium 43 can be a part of a communication network 45 such as an intranetwork or the Internet, or can be a separate transmission media apart from any network. The computing device 12 can generate a threat report 44 and/or threat presentation 45 that includes the event data 38, the threat level data 40, and any alert data 42 generated by such computing device. The threat report 44 and/or threat presentation 45 is transmitted to the user interface unit 16, or more specifically a terminal unit 17 thereof, to generate a presentation thereof. A user can view the report 44 and/or presentation 45 as a visual presentation and/or hear an audio presentation to determine whether a security threat has occurred. In addition, the threat report 44 and/or presentation 45 lists the threat level data associated with respective event data 38 so that the user will be able to determine the degree of danger posed by an event. Thus, the user is able to distinguish and prioritize serious threats from those that are less significant. For threats occurring simultaneously, this feature makes it possible for the user to address the most serious network security threats first and the least dangerous last. In addition, the system can comprise an output unit 19 such as a printer for producing the threat report and/or presentation as a printed document. Alternatively, or in addition to having a printer, the output unit 19 can comprise a disk drive unit to write a threat report 44 and/or threat presentation 45 to a computer storage medium such as a CD-ROM, for example. Such printed output or storage medium may be used to provide a record of a security incident or as forensic evidence of an attack, for example. The output unit 19 can be coupled to receive the threat report 44 and/or threat presentation 45 via communication media 53. The communication medium 53 can be a part of a network 55, or alternatively can be a signal transmission medium that is not a part of a network.

Figure 2:
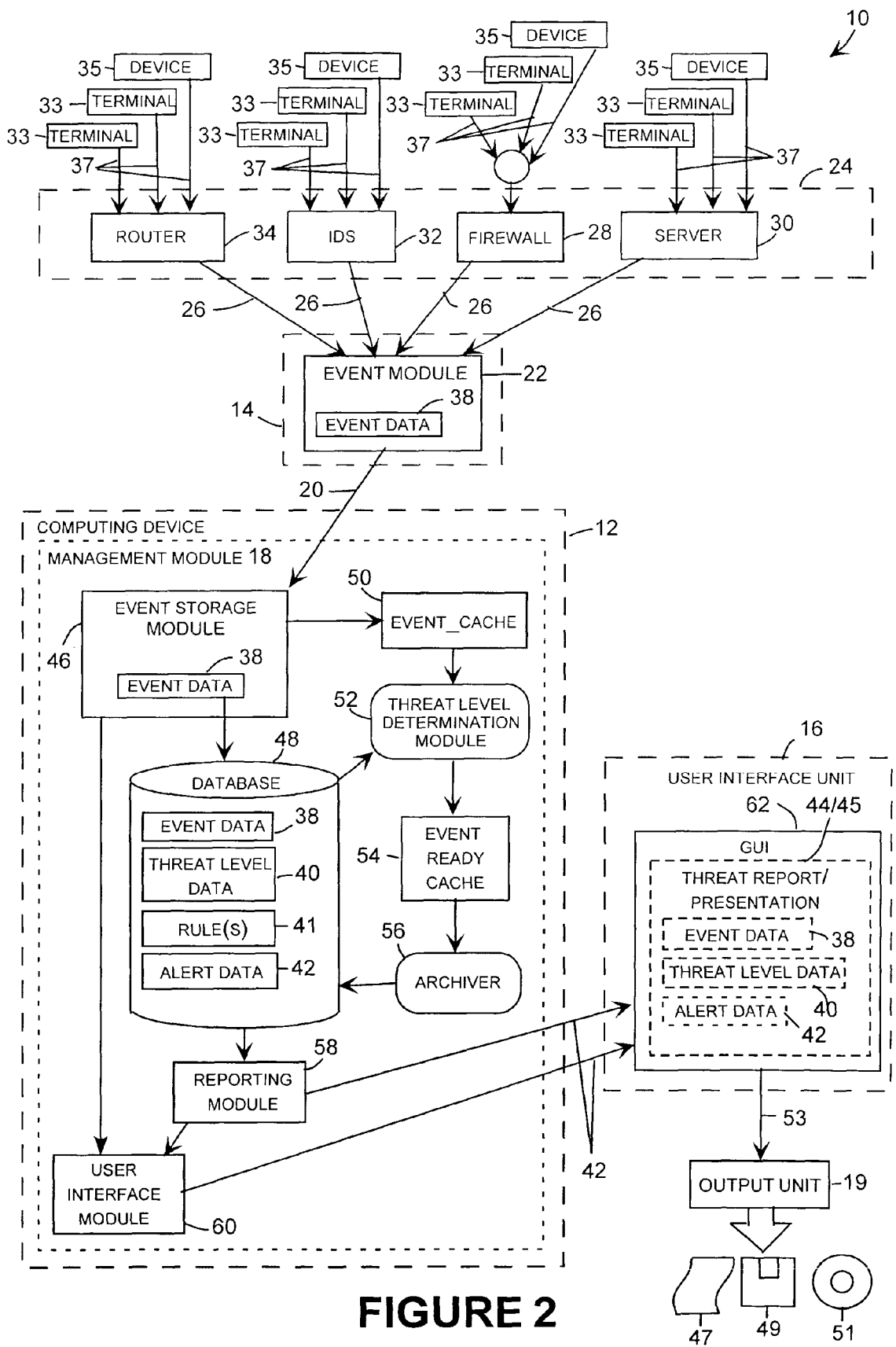
FIG. 2 is a block diagram of the system showing details of a management module.

In FIG. 2, the threat level determination system 10 is shown, including the sensor devices 24, the computing device 14 hosting the event module 18, the computing device 12 hosting the management module 18, the user interface unit 16 and the output unit 19. As previously mentioned, the computing device 14 executes the event module 18 to receive event data 38 from the sensor devices 24, and to forward such event data to the management module 18 of the computing device 12. The management module 18 comprises an event storage module 46, a database 48, an event cache 50, a threat level determination module 52, an event ready cache 54, an archiver 56, a reporting module 58, and a user interface module 60. The event storage module 46 is executed by the computing device 12 to receive the event data from the event module 22. The event storage module 46 stores the event data 38 in the database 48. In addition, the event storage module 46 supplies the event data 38 to the event cache 50 and the user interface module 60. The event cache 50 receives and stores the event data 38 for use by the threat level determination module 52. The threat level determination module 52 retrieves the event data 38 from the event cache 50, and generates threat level data 40 based on the event data 38. In addition, the threat level determination module 52 can retrieve rule(s) 41 to apply to the threat level data 40 to generate alert data 42 indicating whether an attack is in progress or has occurred. The threat level determination module 52 supplies the event data 38, corresponding threat level data 40 and any alert data 42, to the event ready cache 54. The archiver 56 retrieves the event data 38 and corresponding threat level data 40 and alert data 42 from the event ready cache 54, and stores this data in the database 48. The reporting module 58 retrieves the event data 38, threat level data 40 and any alert data 42, and generates at least one report 44 based thereon. The reporting module 58 supplies the threat report 44 to the GUI 60. The user interface module 60 can receive the event data 38, threat level data 40 and alert data 42 if any, and generate a threat presentation 45 based thereon. The user interface module 60 can be coupled to supply the threat presentation 45 to the user interface unit 16 for presentation thereon. The user can operate the GUI 62 to interact with the user interface module 62. The user interface module 60 transmits the user's commands to the event storage module 46 and the reporting module 58 to generate additional threat report 44 and/or a threat presentation 45 to further analyze a potential network threat. A threat report generally differs from a threat presentation in that a threat report lists events associated with a user-specified criterion such as a particular date and time or source or destination IP address involved in a security incident. In contrast, a threat presentation generally lists most recent events by source and destination.

Figure 3:
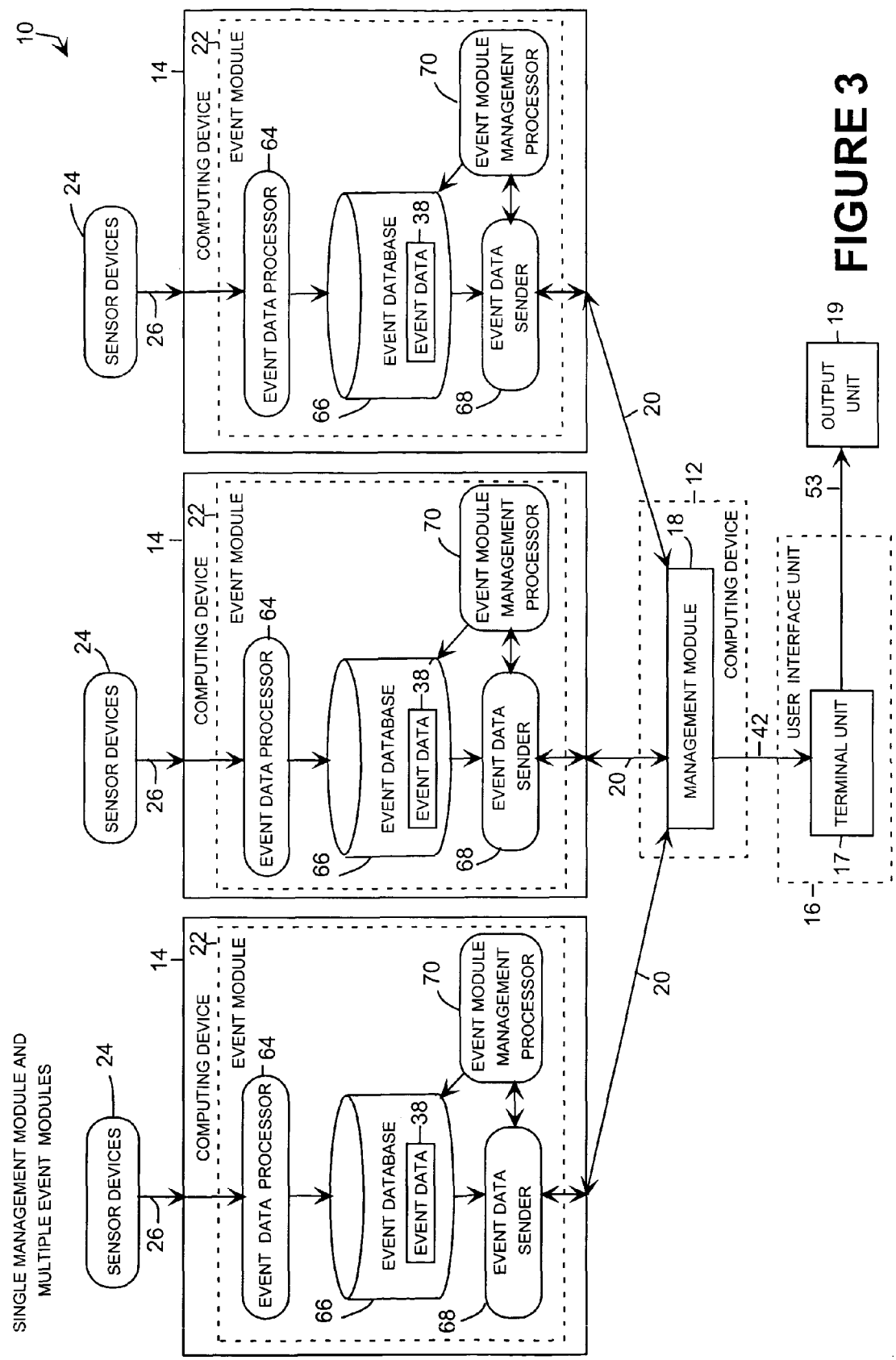
FIG. 3 is a view of the system demonstrating use of a plurality of event modules providing respective event data to a single management module.

FIG. 3 is a relatively detailed view of the event modules 22 of the computing devices 14. The event modules 22 of FIG. 3 each comprise an event data processor 64, an event database 66, an event data sender 68, and an event module management processor 70. The event data 38 is received from respective sensor device(s) 24 by the event data processor 64. The event data processor 64 timestamps the date and time of receipt of the event data 38 by the event module 22. The event data processor 64 normalizes the event data 38 into a uniform format, and stores the normalized event data in the event database 66. In response to a request from the management module 18, upon accumulating a determined amount of data, or at time intervals or periods, the event data sender 68 retrieves the event data 38 from the database 66 and transmits the normalized event data to the management module 18. The event data sender 68 can send the event data 38 for an individual event. However, in some implementations, it may be more efficient for the event data sender 68 to transmit a compilation of event data 38 for a plurality of events in a single file. Whether the event data sender 68 sends individual or compiled event data to the management module 18, the event module 22 preferably provides the event data 38 to the management module 18 sufficiently soon after it receives such data so that a network threat can be detected while it is occurring. This permits time for actions to be taken to thwart or limit the danger posed by the threat. The event module management processor 70 controls the retrieval of event data 38 from the event database 66. The event module management module processor 70 also handles re-routing of event data 38 after detection of a fault in the event module 22 or medium 20 so that corrective action can be taken, as hereinafter described with respect to FIG. 4.

Figure 4:
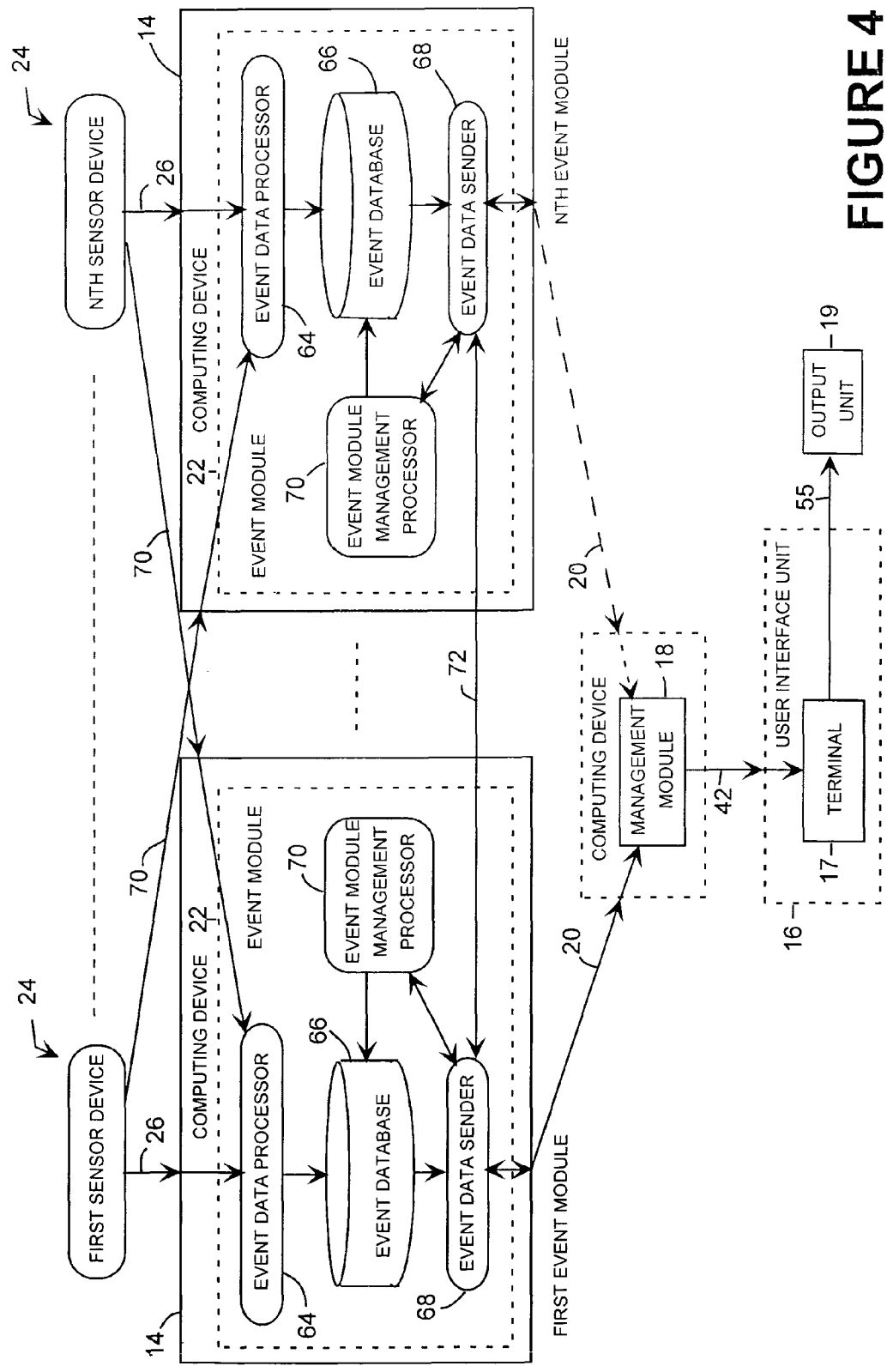
FIG. 4 is a view of the system demonstrating the capability of cross-linking sensor devices to event modules and event modules to each other to provide the capability of one event module to back-up another in the event of a failure in that event module.

FIG. 4 is an alternative configuration that provides a safeguard against event module or communication media failure by providing the event modules 14 with the capability to re-route event data 38 through the use of redundant event modules. In this example, n devices 24 and n corresponding event modules 14 are coupled in communication via lines 26, n being an integer greater than one. In addition, the devices 24 are cross-coupled via communication media 70 to communicate with at least one additional event module 22. In the event of a failure in a line 26 or an event module 22, the device 24 can detect this fact by the event module's failure to respond with an 'accept' or 'acknowledgement' message or the like after the device 24 attempts to transmit event data 38 to the event module 22.

As another failsafe, the event data sender 68 of each event module 22 is cross-coupled via a communication medium 72 to at least one other event data sender 68 of another event module 22. If an event data sender 68 transmits event data 38 to the management module 18 and fails to receive an acknowledgment message via its communication medium 20, then the processor 70 detects this situation. The event module processor 70 controls the event data sender 68 to re-route event data to an event data sender 68 of at least one other event module 22. This alternate event data sender 68 transmits the event data 38 to the management module 18. Through the safeguard measures of FIG. 4, the system 10 is rendered less vulnerable to attack during any period in which a component of the system 10 fails.

Figure 5:
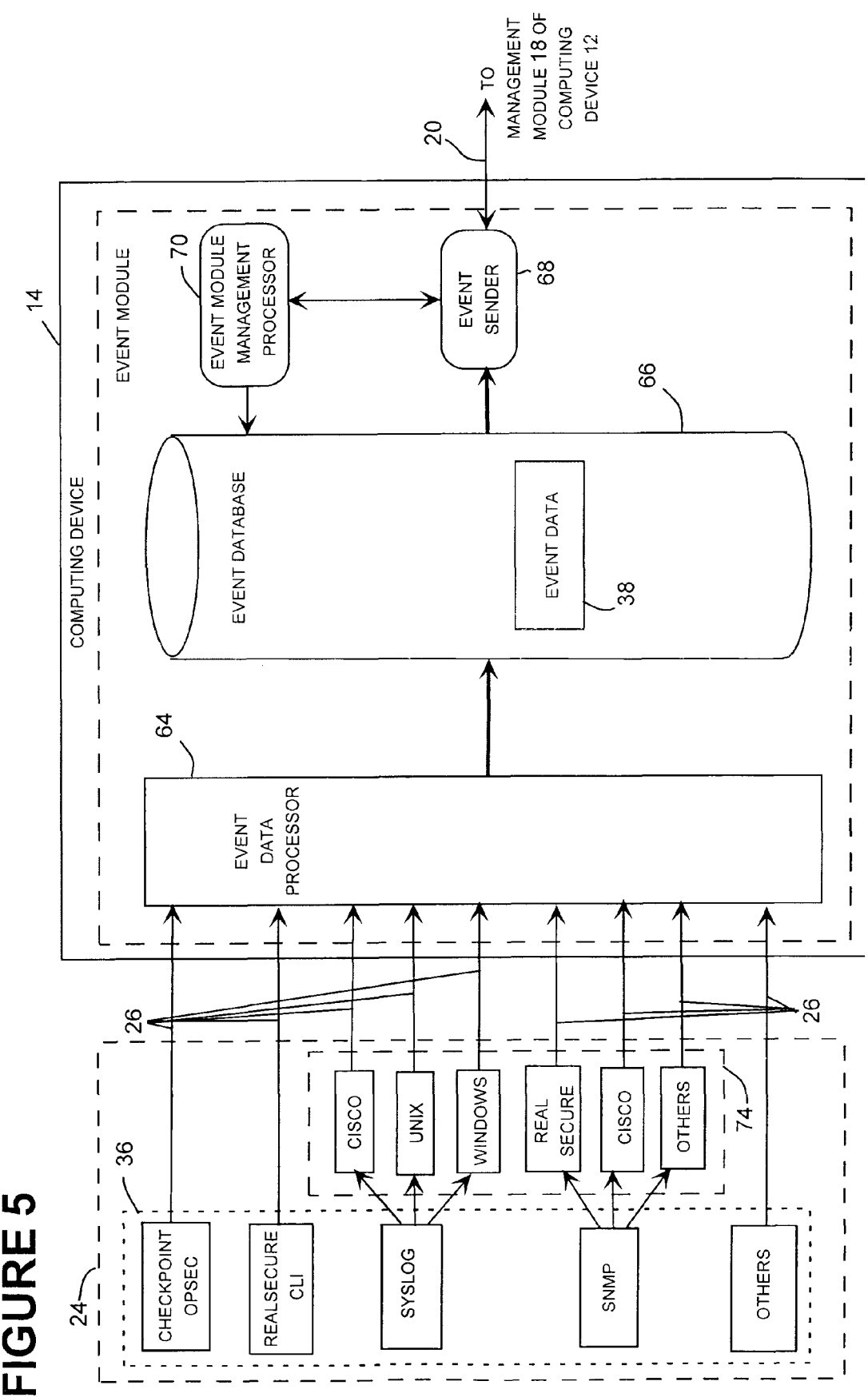
FIG. 5 is a relatively detailed view of different types of sensor devices and an event module to which the sensors provide event data.

FIG. 5 is a relatively detailed view of an event module 22 and associated sensors 36 of devices 24. The sensors 36 comprise can comprise a variety of different sensors, such as the CheckPoint OPSEC, RealSecure CLI, Syslog, Simple Network Management Protocol (SNMP), and others. These sensors 36 are well known and are commercially available. These sensors 36 generate event data 38 transmitted to the event data processor 64, either directly or via a platform 74. More specifically, the CheckPoint OSPEC sensor 36 or the RealSecure CLI sensor 36 can be coupled to supply respective event data 38 to the event data processor 64. The syslog sensor 36 can supply event data 38 via respective Cisco®, UNIX®, or Windows® platforms 74, to the event data processor 64. The SNMP 36 can supply its event data 38 via the Real Secure®, Cisco®, or other platform 74, to the event data processor 64. Other types of commercially available sensors 36 can be used to generate and supply event data 38 to the event database 66, with or without a separate platform 74.

In FIG. 5, the event data processor 64 receives and normalizes the event data 38 into a uniform format. This format can be as follows:

```
events (
  eam_id bigint(20),
  nsid varchar(10),
  utime int(10),
  utimestamp int(10),
  loghost varchar(30),
  logd_product smallint(5),
  proto tinyint(3),
  srcip int(11),
  dstip int(11),
  srcport smallint(5),
  dstport smallint(5),
  xlatesrc int(11),
  xlatedst int(11),
  xlatesport smallint(5),
```

-continued

```
  xlatedport smallint(5),
  priority tinyint(3),
  class_id smallint(5),
  type varchar(80),
  info varchar(255)
)
```

The character string 'events' identifies to the management module 18 and the event module 22 that the bracketed data is event data 38. 'eam_id bigint(20)' is a twenty-digit integer associated with the variable 'eam_id' that identifies that the event module 22 sending the event data 38. 'nsid varchar(10)' indicates that the sensor name data 'nsid' is a ten-digit alphanumeric character string. 'utime int(10)' indicates a ten-digit integer associated with the variable 'utime' indicating the time of the event as reported by the sensor 36. 'utimestamp int(10)' is a ten digit integer indicating the time stamp applied by the event module 22 upon receiving the event data 38 from the reporting sensor 36. 'loghost varchar(30)' is a thirty-digit alphanumeric string associated with the variable 'loghost' identifying the name of the sensor device 24 on which the sensor 36 is running. 'logd_product smallint(5)' is a five-digit integer associated with the variable 'logd_product' identifying the specific sensor 36 that is reporting the event data 38. 'proto tinyint(3)' is a three-digit integer identifying the protocol used by the sensor device 24 to report the event data 38. 'srcip int(11)' is an eleven-digit integer identifying the source address associated with the event, and 'dstip int(11)' is an eleven-digit integer identifying the destination address associated with the event. 'srcport smallint(5)' is a five-digit integer identifying the source port associated with an event, and 'dstport smallint(5)' is a five digit number identifying the destination port associated with an event. 'xlatesrc int(11)' is an eleven-digit integer identifying the translated source address, and 'xlatedst int(11)' is an eleven-digit integer identifying the translated destination address. 'xlatesport smallint (5)' is a five-digit integer identifying the translated source port, and 'xlatedport smallint(5)' is a five-digit integer associated with the translated destination port. 'xlatesrc int(11)', 'xlatedst int(11)', 'xlatesport smallint(5)', and 'xlatedport smallint(5)' values are relevant if the sensor 36 is operated in a network that has a proxy server or the like that translates the network addresses and ports assigned to the sensor device 24 to corresponding IP addresses if reporting event data 38 to the event module 22. Most networks have a limited number of external IP addresses and ports that can be by sensor devices 24 within the network for external access to the Internet or to permit external devices to access via the Internet devices internal to the network. Accordingly, the network addresses are dynamically assigned to the sensor devices 24 as needed by such devices. 'priority tinyint(3)' is a three-digit integer that indicates the threat priority assigned to the event by the sensor 36. 'class_id smallint(5)' is a five-digit integer indicating the classification of an event reported by the sensor device 24. 'type varchar(80)' is an eighty-digit alphanumeric character indicating the action taken by the sensor device 24 with respect to the reported event. 'info varchar(255)' is a two-hundred-fifty-five character alphanumeric string indicating any additional data reported by the sensor device 24 that does not map to one of the preceding categories of data.

The event data processor 64 supplies the normalized data to the event database 66 for storage. On a periodic basis or at time intervals, or in response to a request by the management module 18, the event module management processor 70 controls the event sender 68 and event database 66 to retrieve event data 38 and transmits such event data to the management module 18 of the computing device 12.

Figure 6:
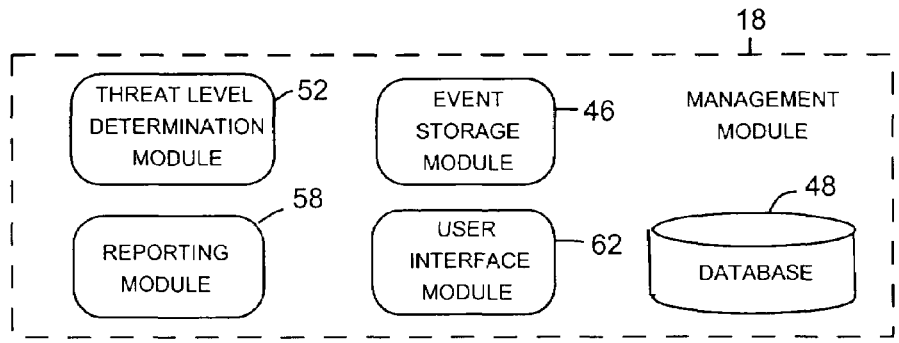
FIG. 6 is a relatively detailed view of the management module including its event storage module, threat level determination module, reporting module, and user interface module.

FIG. 6 is a generalized block diagram of the management module 18. As shown in FIG. 6, the management module 18 comprises the event storage module 46, the threat level determination module 52, the reporting module 58, and the user interface module 62. The event storage module 46 receives event data 38 and stores such event data in a database 48. The threat level determination module 52 determines atomic threat levels based on the source and destination addresses associated with a network event. In addition, the threat level determination module 52 determines whether events are correlated and computes compound threat level data for correlated events. The user interface module 62 generates a graphical user interface for a user to display a threat report 44 or threat presentation 45 including event data, threat level data, and/or alert data if any.

Figure 7:
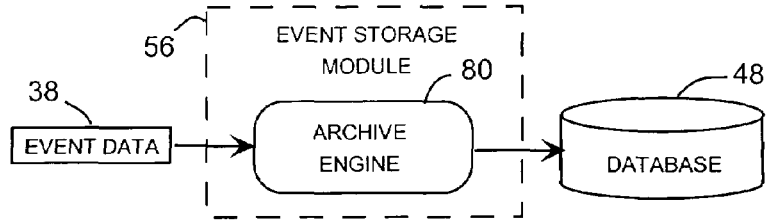
FIG. 7 is a relatively detailed view of the event storage module indicating its ability to store event data in a database using its archive engine.

FIG. 7 is a generalized block diagram of the event storage module 56 that includes an archive engine 80. The event storage module 56, or more particularly, the archive engine 80, receives event data 38 from an event module 22. The event storage module 56 timestamps the event data with the date and time of receipt at the management module 18. The event module 22 also generates and associates unique identifier data with the event data to permit the event data to be distinguished from other event data. Lastly, the event module 22 stores such data in the database 48.

Figure 8:
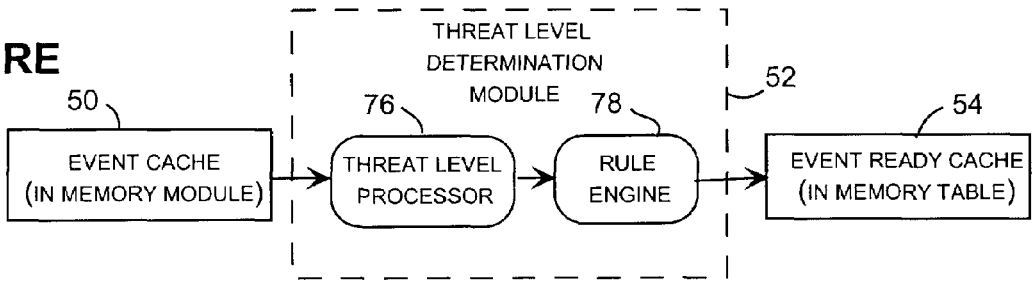
FIG. 8 is a relatively detailed view of the threat level determination module and its threat level/event correlation processor and rule engine that can be used to generate threat level data and alert data.

FIG. 8 is a relatively detailed view of the threat level determination module 52. The threat level determination module 52 comprises a threat level processor 76 and a rule engine 78. The threat level processor 76 is coupled to receive event data 38 from the event cache 50, and generates atomic threat level data based thereon. In addition, the threat level processor 76 determines whether event data 38 is correlated. Generally, the threat level processor 76 performs this function by determining event data 38 with the same source and/or destination address. Using the correlated event data, the threat level processor 76 computes frequency and differential compound threat level data.

The rule engine 78 can apply user-specified rules to determine whether to set or reset a security alarm generated for the user via the GUI 62. For example, the user can indicate that if the threat level(s) of the threat level data equals or exceeds a user- specified level, then the rule engine 78 generates alert data 42 to trigger an alarm for the user via the GUI 62. Conversely, if the threat level data is less than the user-specified level, then the rule engine 78 generates the alert data 42 so that the alarm is reset or remains inactivated. The rule engine 78 can be used to set one or more Boolean logic operators or mathematical functions for generation of threat level data 40. For example, the Boolean logic operator may be an AND operation to generate a threat report 44 if the source threat level data exceeds a first user-specified level set by the rule 41 and the destination threat level data exceeds a second user-specified level set by the rule 41. Boolean logic operators can include AND, OR, NOT, etc. The resulting threat level data 40 and alert data 42 are supplied to the event ready cache 54.

Figure 9:
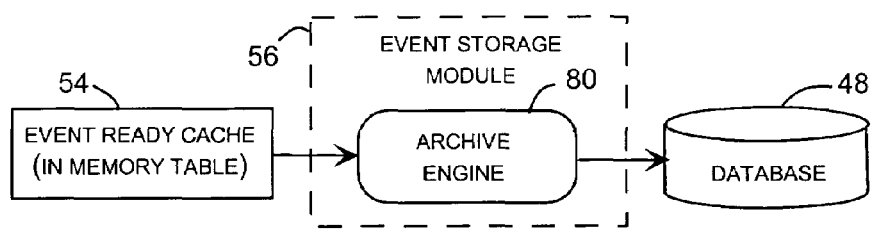
FIG. 9 is a relatively detailed view of the event storage module and its function of storing threat level data, event data, and alert data in the database of the management module.

As shown in FIG. 9, the event storage module 56 comprises an archive engine 80. The archive engine 80 receives the threat level data 40 and alert data 42 generated by the threat level determination module 52, and stores this data in the database 48.

Figure 10:
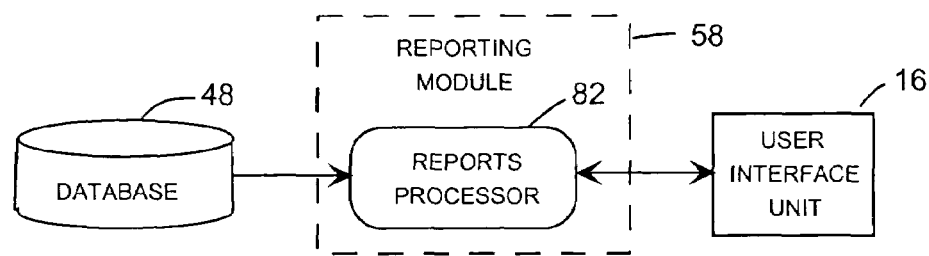
FIG. 10 is a relatively detailed view of the reporting module and its function of generating a report for presentation on a user interface unit and/or output in printed form and/or on storage media via an output unit such as a printer or disk drive.

Referring to FIG. 10, the reporting module 58 comprises a reports processor 82 that generates a threat report 44 based on the event data 38, the threat level data 40, and alert data 42. The threat report 44 can be generated by the reports processor 82 based on criteria set by the user with the GUI module 62. For example, the user can specify a date/time range, source IP address, destination IP address, or other criteria for generation of the report. The reporting module 58 can generate the threat report 44 based on the user-specified criteria.

Figure 11:
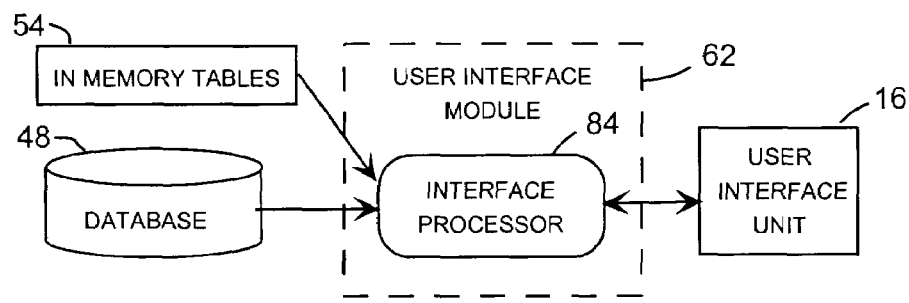
FIG. 11 is a relatively detailed view of the user interface module for generating a presentation including event data and associated threat level data as well as any alert data generated by the management module for corresponding events.

In FIG. 11, the user interface module 62 comprises a reports processor 84. The reports processor 84 is coupled to receive the threat level data 40 and alert data 42 from the event ready cache 54. In addition, the reports processor 84 is coupled to receive the event data 38, threat level data 40, and alert data 42 stored in the database 48. The reports processor 84 uses this data to generate a presentation on the GUI 60. The presentation can list the event data 38 in correspondence with its respective threat level data 40 and alert data 42 that may have been generated by such event(s).

Calculation of Atomic Threat Level Data

A. Source Threat Level Data

The function executed by the threat level determination module 52, or more specifically, the threat level processor 76, to determine source threat level data is as follows:

src_threat=src_tw_table[src_ip_address]* src_nb_tw_table[src_netblock]

'src_threat' is the variable name associated with the value of the atomic threat level data source of the network event.

'src_tw_table[src_ip_address]' is the threat weight for the source IP address originating the network event and is a measure of how threatening the source address is. For example, if the source address originates outside of an intranetwork, it may be determined to have more probability of being an attack as compared to a source address within the intranetwork. In addition, if the source address is known or suspected to have been involved in an attack on a network in the past, then this threat level could be set to a higher weight to reflect this risk. Conversely, if the source address has not been associated with an attack in the past, then this source address may be associated with a threat weight that is closer to neutral.

'src_nb_tw table[src_netblock]' is the threat weight associated with an IP address range of which the source IP address is a member. For example, blocks of IP address ranges that originate outside of the network may be more threatening then IP address blocks such as the 10.xxx.xxx.xxx which originate within the in which '10 is the most significant byte of the four byte IP address and 'xxx' indicates that the associated value may be any value from 0-255.

'*' is the multiplication operator.

B. Destination Threat Level Data

The function executed by the threat level determination module 52, or more specifically, the threat level processor 76, to determine destination threat level data is as follows:

dst_vulnerability=
dst_v_table[dst_addr][event_type]* dst_c_table[dst_addr]* dst_cnb_table[dst_net block]

'dst_vulnerability' is the variable name associated with the value for the destination threat level of the network event.

'dst_v_table[dst_addr][event_type]' is the value of the element of a table that is addressed using the destination address associated with the network event and type of event associated with the event under analysis. For example, if the destination address is a particular work station, then this may be less threatening than if the destination address were a crucial network server, for example. The type of event may also be threatening. For example, a request to a network address to accept an applet, cookie, or other code may be more threatening than one requesting access to public data.

'dst_c_table[dst_addr]' is the threat weight associated with the destination IP address. It is a measure of the sensitivity or vulnerability of the destination resource or device to attack. For example, the resource or destination address may have relatively little protection from unauthorized access or present the possibility of calamitous results in the event of an unchecked attack. These factors may warrant assignment of a higher threat weight as compared to a situation in which a resource or device associated with a destination address were relatively invulnerable to attack or little of consequence would result from a successful attack, for example.

'dst_cnb_table[dst_netblock]' is the threat level associated with the range of destination addresses of which the destination IP address is a member. In many cases, a range of destination addresses can be evaluated relative to others for its vulnerability or criticality. For example, if the destination network block addresses are associated with user's desktop computers, then the possibility of damage resulting from attack may be less than if the destination block corresponds to a bank of servers that are integral to operation of an enterprise.

C. Event Validity Data

The function executed by the threat level determination module 52, or more specifically, the threat level processor 76, to determine event validity data is as follows:

'event_validity'=validities_table[log_src][event_type].

'event_validity' is a measure of certainty as to whether a suspected network attack actually occurred.

The validities_table[log_src][event_type] is a value determined by the source address 'log_src' associated with the event under analysis and the 'event_type' which indicates the type of event. Hence, the value for 'event_validity' depends upon the source IP address originating a network event as well as the type of event. For example, an event initiated by a source known previously to be a threat requesting to delete certain network files would generally constitute a relatively high degree of event validity. Conversely, if the source address is that of the network administrator requesting to read a data file, then a low degree of event validity would generally exist to reflect a comparatively low-threat situation.

D. Event Severity Data

The function executed by the threat level determination module 52, or more specifically, the threat level processor 76, to determine event severity data is as follows:

Event_severity( )=ev_priority.

'Event_severity( )' is a measure of the severity of the attack. For example, an attack involving a virus or worm would generally be associated with a relatively high value of event severity.

'Ev_priority' is a value that can be set by a user or computer program to reflect the severity of a particular type of event.

E. Total Event Threat Level Data

'Event_threat_level'=event_validity( )* dst_vulnerability ( )* src_threat( )* event_severity( ).

The total 'event_threat_level' is thus the multiplication of the event_validity( ), dst_vulnerability( ), src_threat( ), and event_severity( ). It is thus a measure of the total atomic threat level posed by an event.

Calculation of Compound Threat Level Data

A. Calculation of Compound Threat Level Data

The function executed by the threat level determination module 52, or more specifically, the threat level processor 76, to determine frequency threat level data over the first time period P1 is as follows:

'ctl_p1[host]'=sum(atomic threat level values for host in period P1)/count(number of events for host in period P1).

'Host' is the source or destination address associated with the event.

'ctl_p1' is the compound threat level for a specific host for the period P1.

'sum(atomic threat level values for host in period P1)' is a summation of the atomic threat level values for the host, whether destination or source IP address associated with the event(s), for correlated events occurring within the time period P1.

'count(number of events for host in period P1)' is a count of the number of correlated events for the host, whether source or destination IP address, occurring over the time period P1.

"/" is the division operator.

Similarly, the function executed by the threat level determination module 52, or more specifically, the threat level processor 76, to determine frequency threat level data for the second time period P2 is as follows:

'ctl_p2[host]'=sum(atomic threat level values for host in period P2)/count(number of events for host in period P2).

'Host' is the source or destination address associated with the event.

'ctl_p2' is the compound threat level for a specific host for the period P2.

'sum(atomic threat level values for host in period P2)' is a summation of the atomic threat level values for the host, whether destination or source IP address associated with the event(s), for events occurring within the time period P2.

'count(number of events for host in period P2)' is a count of the number of events for the host, whether source or destination IP address, occurring over the time period P2.

B. Calculation of Compound Threat Level Data

The function executed by the threat level determination module 52, or more specifically, the threat level processor 76, to determine 'differential' threat level data for the second time period P2 is as follows:

eroc[host]=ef_p1/ef_p2

'ef_p1[host]'=count(events for host in period P1)/P1. In other words, the value 'ef_p1[host]' is equal to the count of the events over the period P1 divided by the period P1.

'ef_p2[host]'=count(events for host in period P2)/P2. The value 'ef_p2[host]' is thus equal to the sum of the events over the period P2 divided by the period P2.

The differential threat level data can be determined for the source or destination IP address, or both.

Figure 12:
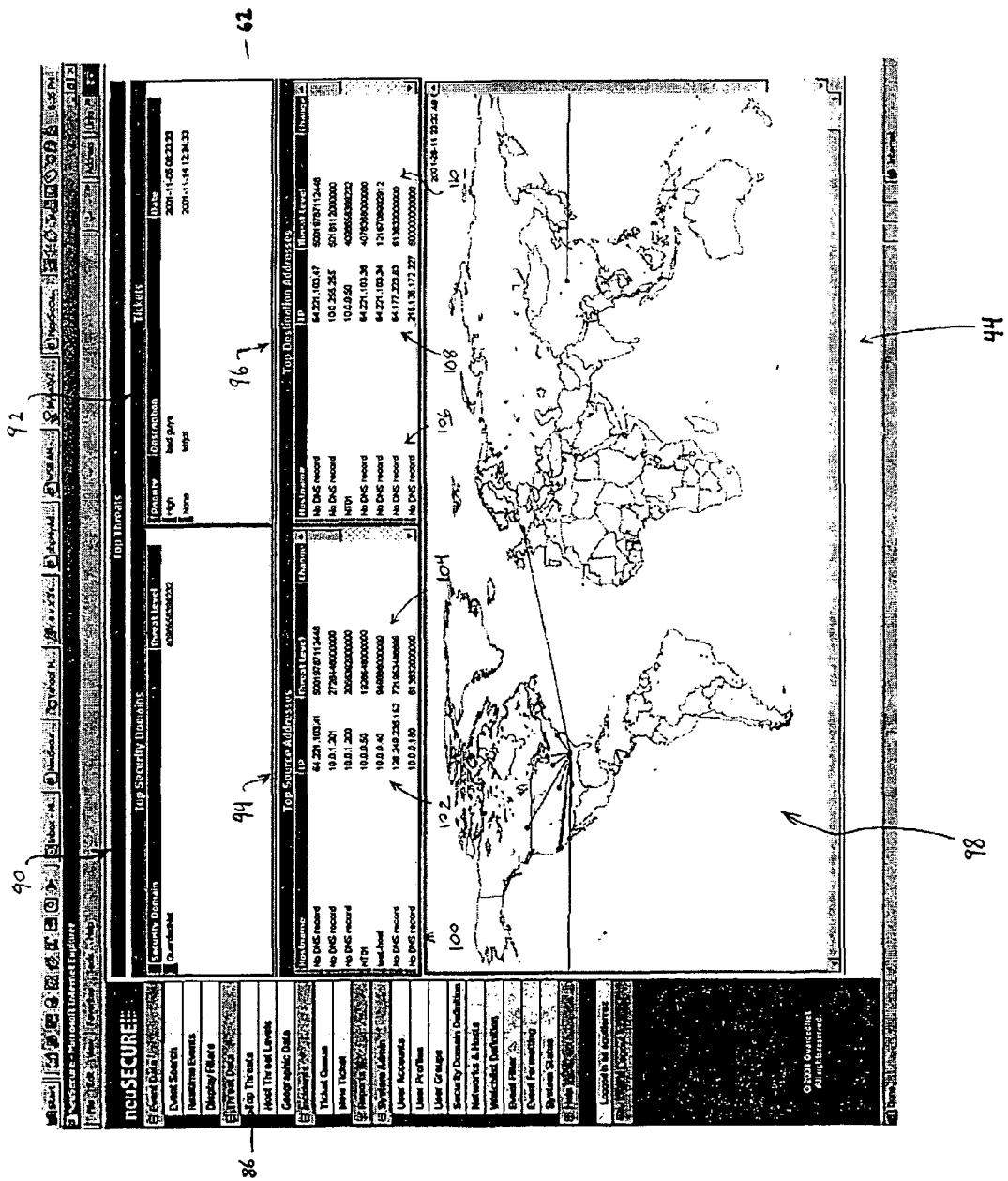
FIG. 12 is a view of an exemplary embodiment of a graphical user interface (GUI) display on a user interface unit indicating a presentation of event data and threat level data.

FIG. 12 indicates a GUI 62 that in this case corresponds to tab 86 for the 'top threats' threat report 44. The user can use the GUI 62 to click on the 'top threats' tab with a mouse-controlled cursor, for example, causing the management module 18 to generate the 'top threats' report 44 indicating the events having the highest threat levels. Window 90 indicates the top security domain that is the subject of the threat report 44. For example, referring to FIG. 1, the Departments A, B, C may be security domains, and all of these together may be considered a larger security domain. In the case of FIG. 11, the security domain for 'GuardedNet' company is indicated along with its associated threat level. Window 92 indicates job tickets that alert the user of the occurrence of attacks requiring the user's attention. The window 92 indicates the priority of the threat event, a description of the matter associated with the threat event, and the date and time on which the ticket was created. Each ticket can be used to track an attack incident from detection until resolution so that the user can manage security measures concerning threat incidents. The window 94 indicates top source addresses including hostname (if known) 100, source IP address 102, and threat level 104 indicating the degree of threat posed by a respective source. The window 96 indicates top destination addresses including hostname 106, destination IP address 108, and associated threat level data 110. The threat report 44 can also comprise a map 98 indicating the geographic origin of a threat or suspect event.

Figure 13:
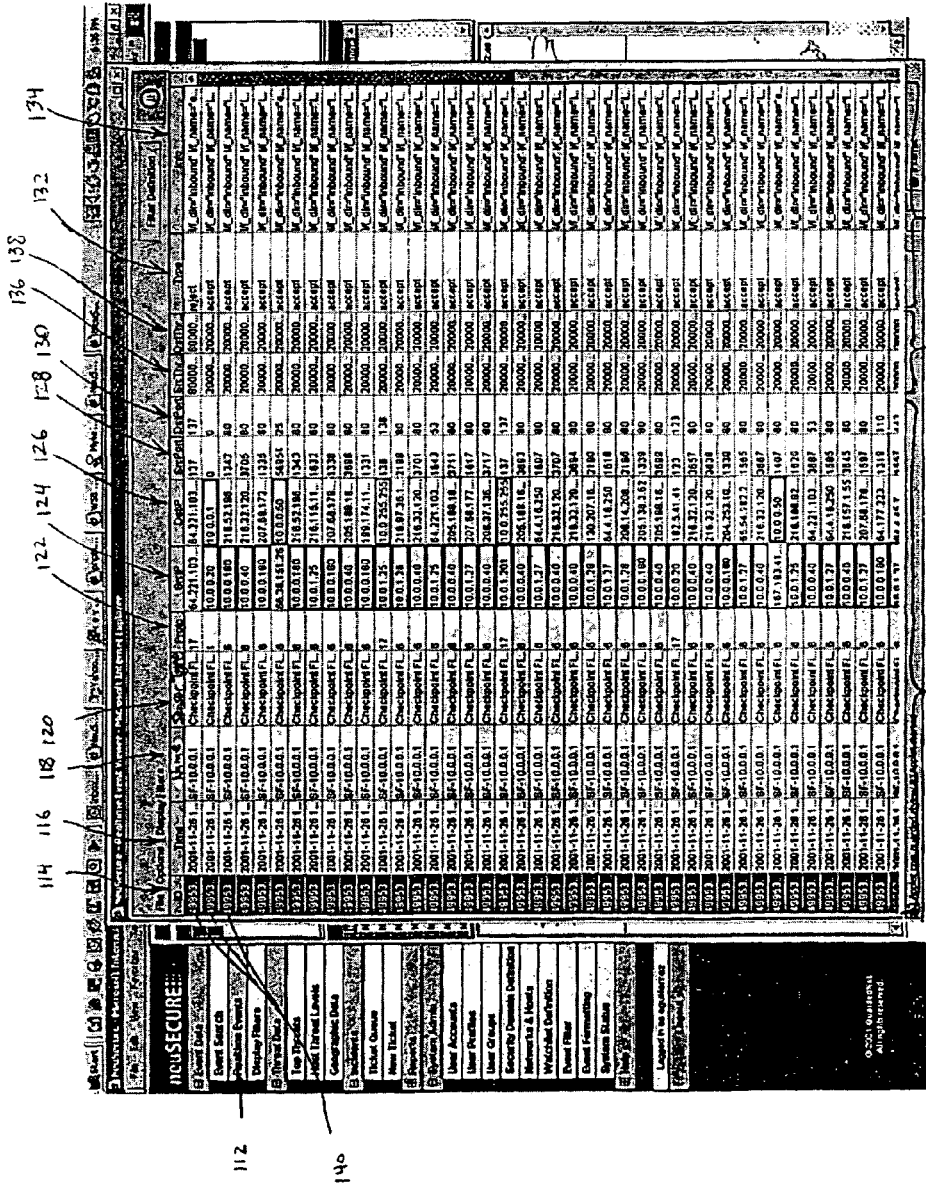
FIG. 13 is a view of another exemplary GUI display on a user interface unit indicating another possible presentation of event data and threat level data.

FIG. 13 is a view of a threat presentation 45 initiated by the user by activating 'Realtime Events' tab 112 using a mouse-controlled cursor, for example. The threat presentation 45 comprises event data 38 and threat level data 40. The event data 38 comprises event identifier data 114, timestamp data 116, sensor name data 118, sensor type data 120, protocol data 122, source IP address 124, destination IP address 126, source port 128, destination port 130, action type 132, and additional data 134. The threat level data 40 comprises atomic source threat level data 136 and atomic destination threat level data 138. The event data 38 and threat level data 40 are arranged in rows 140, each of which corresponds to a single event.

The event identifier data 114 comprises a unique identifier generated by the event storage module 46. The event identifier data 114 allows tracking of an associated event. It may also serve as an index for event data 38 stored in a table in the database 48. The timestamp 116 is generated and included in the event data 38 by the event storage module 46. The timestamp 116 includes the date and time of receipt of the event data 38 at the management module 18. The sensor name data 118 is the name of the sensor 36 generating the event data 38. In the example of FIG. 13 the sensor name is 'SF-10.0.0.1.' The sensor type data 120 is the type of sensor 36 generating the event data 38. In the example of FIG. 13, the sensor type listed is 'CheckPoint FireWall-l' which is a vendor and model of a particular software package. The protocol data 122 indicates the protocol used by the sensor 36 reporting the event data 38. In the example of FIG. 13, numbers represent the protocol. For example, the number '17' refers to 'User Datagram Protocol' (UDP) and the number '6' refers to 'transmission control protocol/internet protocol' (TCP/IP). The protocol used to transmit the event data 38 from the event module 22 to the management module 18 is important from the standpoint that some protocols are more simply hacked or spoofed than others. For example, the UDP protocol has no source address so that the source of the event data 38 in the UDP format cannot be determined by examination of its packets. Conversely, TCP/IP protocol includes both the source and destination address so that it is more difficult to hack or spoof. The source IP address data 124 indicates a source IP address associated with an event. The source IP address data 124 can be indicated as a 'quad-4' number, i.e., a four byte address such as '64.2221.103.021.' with each of the four bytes being a number from 0 to 255. As shown in FIG. 13, the destination IP address data 124 is a 'quad-4' number with four bytes, each byte being a number from 0 to 255, separated by periods. Thus, in the first row 140 of FIG. 13, the destination IP address data 124 is '64.221.103.255.' The source port data 128 indicates the port of the source IP address associated with the respective event data 38. For example, firewalls generally use 'port 80' for network traffic that is outbound from an intranetwork to the World Wide Web or Internet. The destination port 130 indicates the port of the device with the destination IP address that is associated with respective event data 38. The action type data 132 indicates the action taken by the sensor 38 reporting the event. Hence, for example, the action type data 132 may indicate 'reject' to indicate the sensor 36 rejected the network packets or traffic associated with the event so that it could not reach the destination IP address. Conversely, the action type data 132 may indicate 'accept' to reflect the acceptance by the sensor 36 of the network traffic associated with the destination IP address. The additional data 134 includes any data reported by the sensor 36 as part of the event data 38 that cannot be mapped to data 114, 116, 118, 120, 122, 124, 126, 128, 130, 132, or 134. By preserving such data, a user can determine further information regarding a particular event if desired. The source threat level data 136 is the atomic threat level for the source that has been previously discussed in detail. The destination threat level data 138 is the atomic threat level for the destination, also previously discussed in detail. The GUI 62 of FIG. 13 is advantageous from the standpoint that the user can view source and destination threat levels 136, 138 simultaneously. This can be important from the standpoint that if a particular source destination is attempting to hack or break into network resources, the destination threat level data 136 will likely reveal this fact to the user. On the other hand, if a person initiating a network attack is using multiple source IP addresses to disguise the fact that such person is attempting to obtain unauthorized access of a network resource, the attack can be revealed if it is targeted to a single destination IP address because the destination threat level data 138 will be relatively high.

Figure 14:
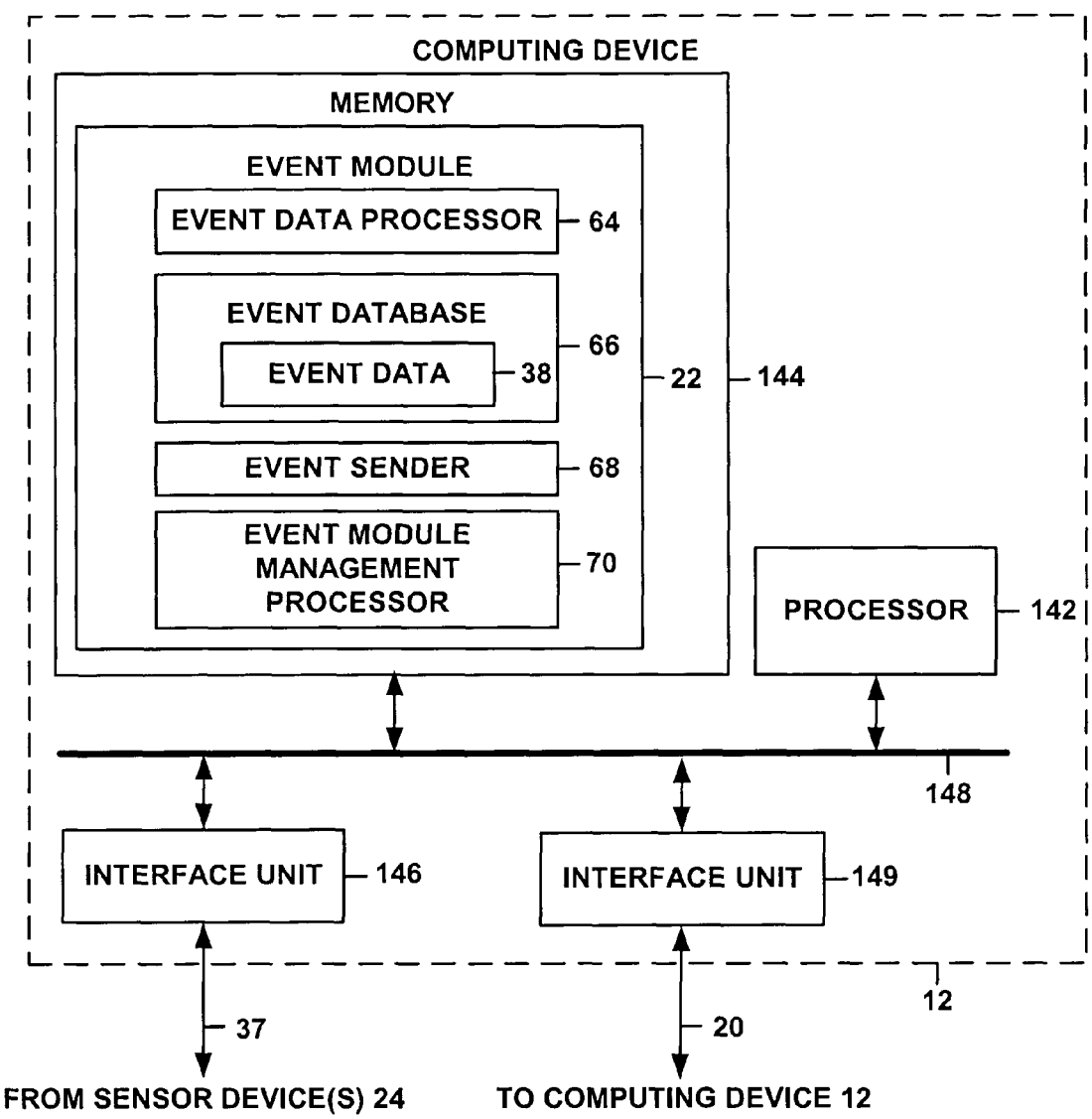
FIG. 14 is a block diagram of a computing device hosting the event module.

In FIG. 14, details of the computing device 12 are shown The computing device 12 comprises a processor 142 and a memory 144, and can further comprise an interface unit 146. The processor 142, memory 144, and interface unit 146 are coupled together via bus 148. The memory 144 stores the event module 22 that stores the event data processor 64, the event database 66, the event sender 68, and the event module management processor 70. The memory 144 also stores the event data 38. The interface unit 146 is coupled to one or more sensor device(s) 24 that generate event data 38. The processor 142 controls receipt of event data 38 from the sensor device(s) 24 via the bus 148. The processor 142 executes the event data processor 64 to receive, normalize and store the event data 38 in the memory 144. The processor 142 also executes the event sender 68 to transmit the normalized event data 38 to the management module 18. Furthermore, the processor 142 executes the event module management processor 70 to trigger the event sender 68 to transmit event data 38 to the management module 18 via the bus 148 and interface unit 146. The processor 142 can further execute the event module management processor 70 to control transmission of the event data 38 to a different event module 22 in the event of event module failure, for transmission to the management module 18.

Figure 15:
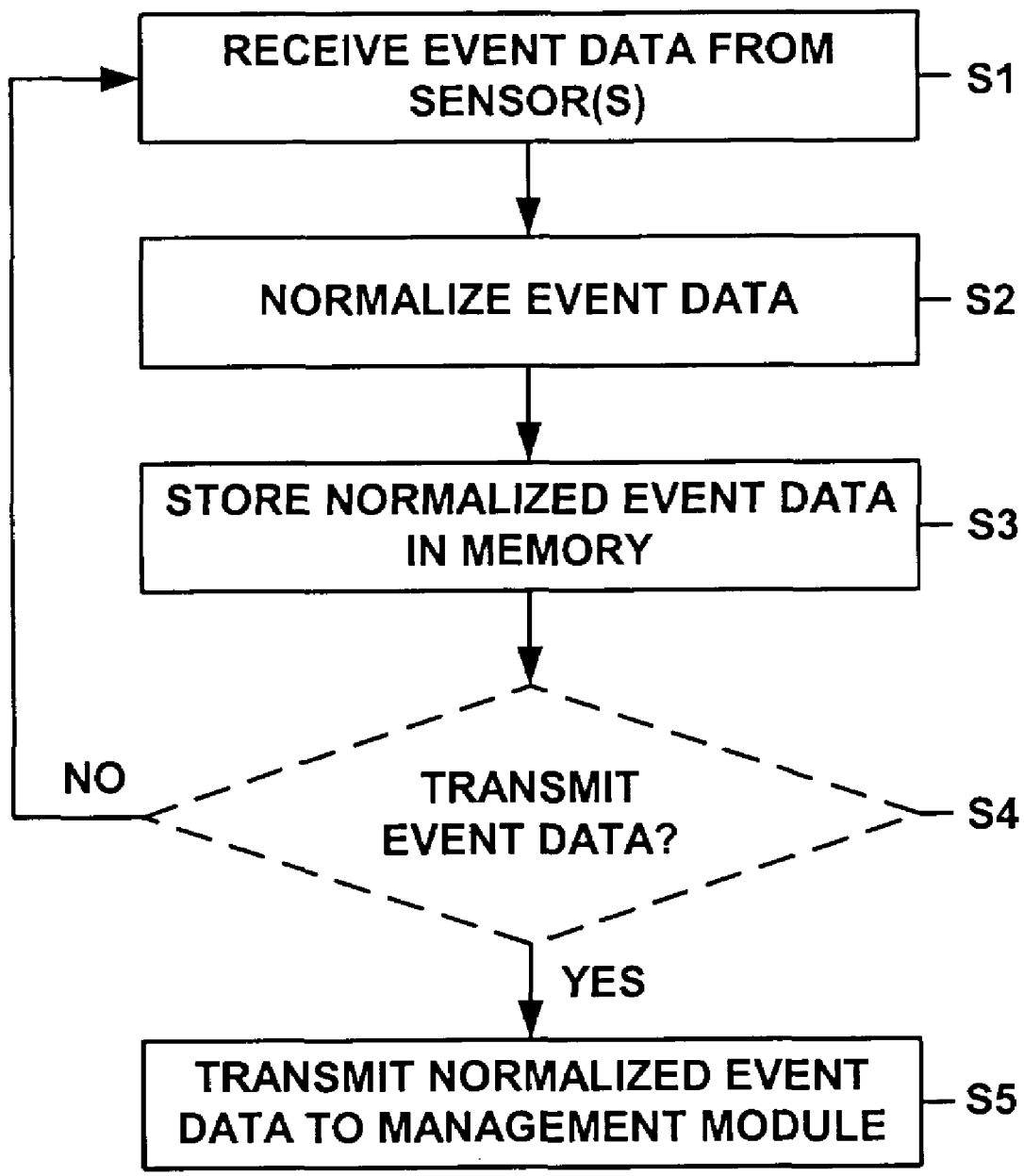
FIG. 15 is a flowchart of a method performed by a processor of the computing device executing the event module.

FIG. 15 is a flowchart of a method for receiving, normalizing and transmitting event data 38 to the management module 18. The method of FIG. 15 can be performed by the computing device 12, or more specifically, the processor 142 by executing the event module 22. In step S1 the computing device 12 receives event data 38 from the sensor(s) 36. In step S2 the computing device 12 normalizes the event data into a common format. In step S3 the computing device 12 stores the normalized event data 38 in the memory 144. In step S4 the computing device 12 determines whether the event data 38 is to be transmitted to the management module 18. If not, the computing device 12 repeats step S1 and subsequent steps. Conversely, if the determination in step S4 is affirmative, in step S5 the computing device 12 transmits the normalized event data 38 to the management module 18.

Figure 16:
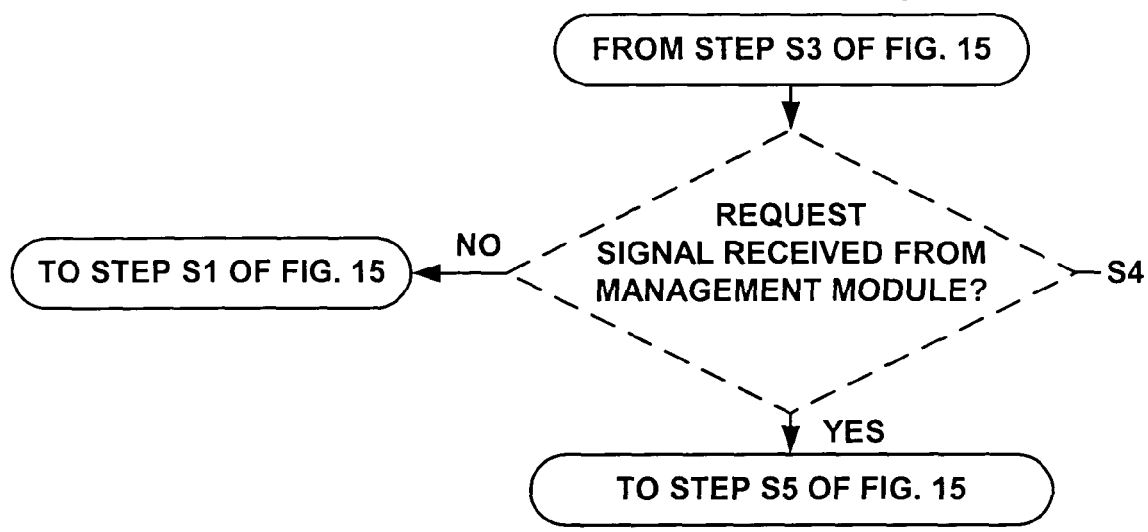
FIG. 16 is a first version of a determination step of the method of FIG. 14.
Figure 17:
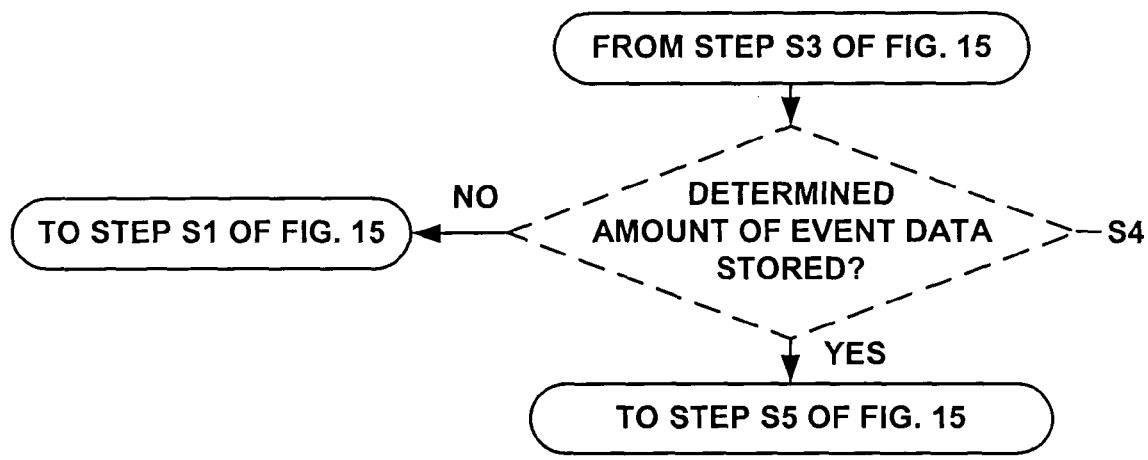
FIG. 17 is a second version of the determination step of the method of FIG. 14.
Figure 18:
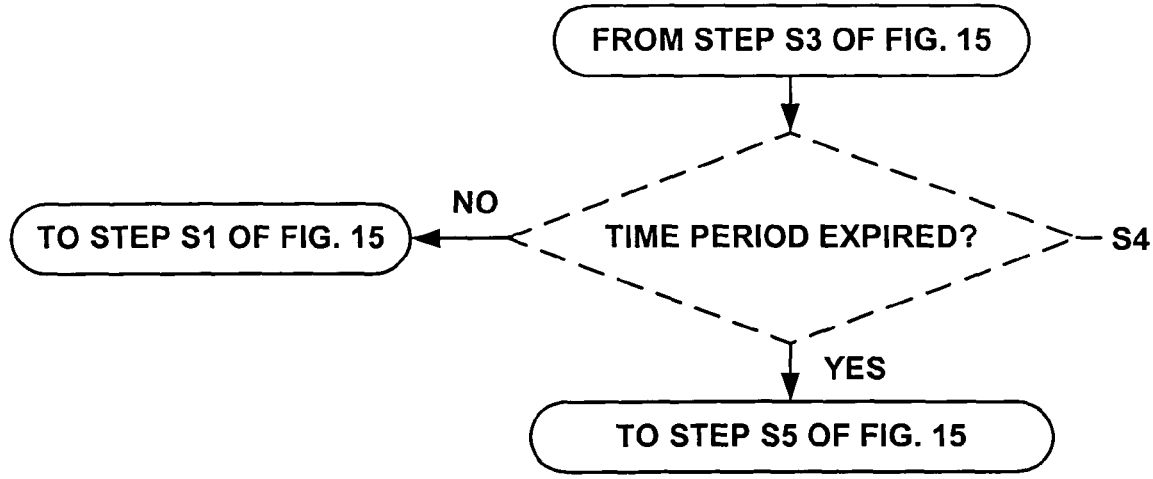
FIG. 18 is a third version of the determination step of the method of FIG. 14.

FIGS. 16-18 are relatively detailed alternative options for the determination step S4 of the method of FIG. 15. In FIG. 15 the computing device 14 determines whether a request signal has been received from the management module 18. If the determination in step S4. of FIG. 16 is affirmative, then the event module 22 Is executed by the processor 142 to transmit the event data 38 to the management module 18 via the bus 148, the interface unit 146, and the communication media 20. Conversely, if the determination in step S4 of FIG. 16 is negative, then the computing device 12 does not transmit the event data 38 to the management module 18 but instead returns to step S1 of FIG. 15 to receive additional event data 38.

In FIG. 17 the determination of step S4 of FIG. 15 is made based upon whether a determined amount of event data 38 has been received from the sensor(s) 24. In the embodiment of step S4 of FIG. 16, the event data 38 is transmitted to the management module 18 only after a determined amount of event data has been aggregated for transmission to the management module 18. Aggregation of event data 38 has the possible advantage of requiring less data processing capacity by the event module 22 and management module 18. Because a single file with data for several events can generally by assembled, transmitted, and received by the event module and management module more readily than several files for each single event, aggregation of event data in a single file can be advantageous. However, aggregating of event data 38 poses possible delay in detecting an attack upon a network device due to the delay in transmission of event data 38 from the reporting sensor 36, to the event module 22, and finally to the management module 18. In general, it is desired that aggregation of event data 38 be performed but not so as to delay transmission of event data to the point of limiting the ability of the system 10 to detect an attack while it is occurring.

In FIG. 18 the determination of step S4 of FIG. 15 is made on the basis of whether a determined time period has expired. The time period is set before execution of step S4, and may be set by a user or machine. In general, it is preferred that this time period be sufficiently short so that an attack can be detected while it is occurring to provide the possibility of taking countermeasures to defeat an attack. In general, such time period would normally be on the order of a second or less. If the determination of step S4 of FIG. 18 is affirmative, in step S5 of FIG. 15 the event module 22 transmits the event data 38 to the management module 18. Conversely, if the determination in step S4 is negative, the method returns to step S1 of FIG. 15 to receive additional event data.

Figure 19:
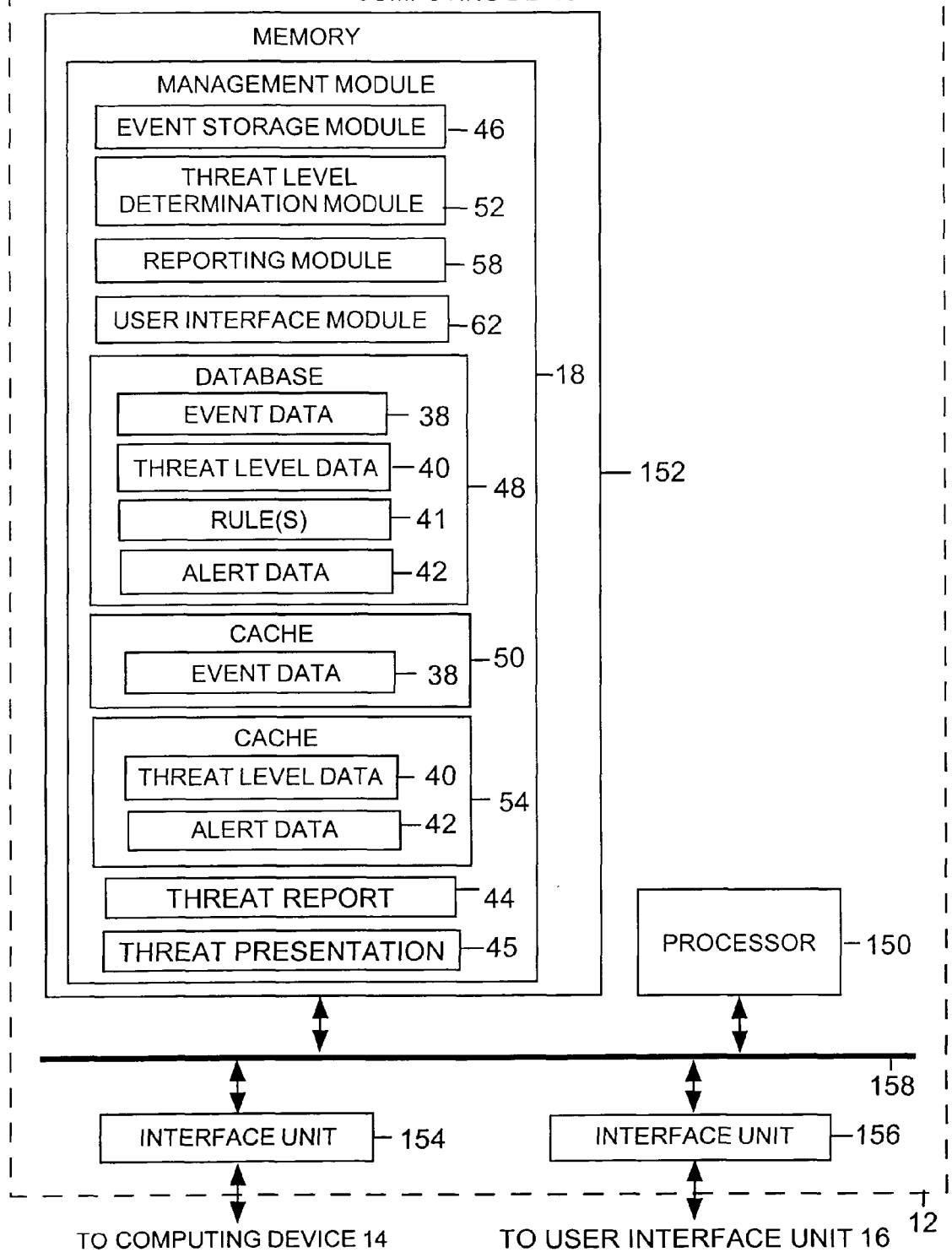
FIG. 19 is a block diagram of a computing device hosting the management module.

In FIG. 19 the computing device 12 comprises a processor 150 and a memory 152. The computing device 12 can further comprise interface units 154, 156, and bus 158. The bus 158 couples together the processor 150, memory 152, and interface units 154, 156. The processor 150 is coupled to receive event data 38 from the event module 22 via the interface unit 154 and the bus 158. The processor 150 stores the event data 38 in the database 48 stored in memory 18 via the bus 158. In addition, the processor 150 executes the event storage module 46 to receive and store the event data 38 in the cache 50. The processor 150 executes the threat level determination module 52 to read the event data 38 from the cache 50 and to correlate this data by source and/or destination address. The processor 150 also executes the threat level determination module 52 to generate threat level data 40 based on the event data 38. More specifically, the processor 150 generates atomic and compound threat level data 40 and stores this threat level data in the cache 54. In addition, the processor 150 can execute the threat level determination module 52 to retrieve the rule(s) data 41 from the database 48. The processor 150 uses the rule(s) data 41 to operate on the threat level data 40 to determine whether the threat level data indicates that an attack or potential attack of a network resource has occurred. Depending upon the threat level data 40, the operation thereon by the processor 150 can result in the generation of alert data 42 indicating that an attack or potential attack has occurred in the system 10. The processor 150 stores the resulting alert data 42 in the database 48. Conversely, if the application of the rule(s) data 41 to the threat level data 40 results in no activation of alert data 42, then execution of the threat level determination module 52 by the processor 150 terminates.

The processor 150 can execute the reporting module 58 to generate a threat report 44 based on the event data 38, threat level data 40, and/or alert data 42. The processor 150 transmits the threat report 44 to the user interface unit 16 to generate a display, for example, of the threat report. In addition, the processor 150 can execute the user interface module 62 to generate a threat presentation 45 such as a display and/or sonic presentation, based on the event data 38, the threat level data 40, and/or the alert data 42. The processor 150 transmits the threat presentation 45 via the bus 158 and interface unit 156 to the user interface unit 16. The user interface unit 16 renders the threat presentation 45 for the user.

Figure 20:
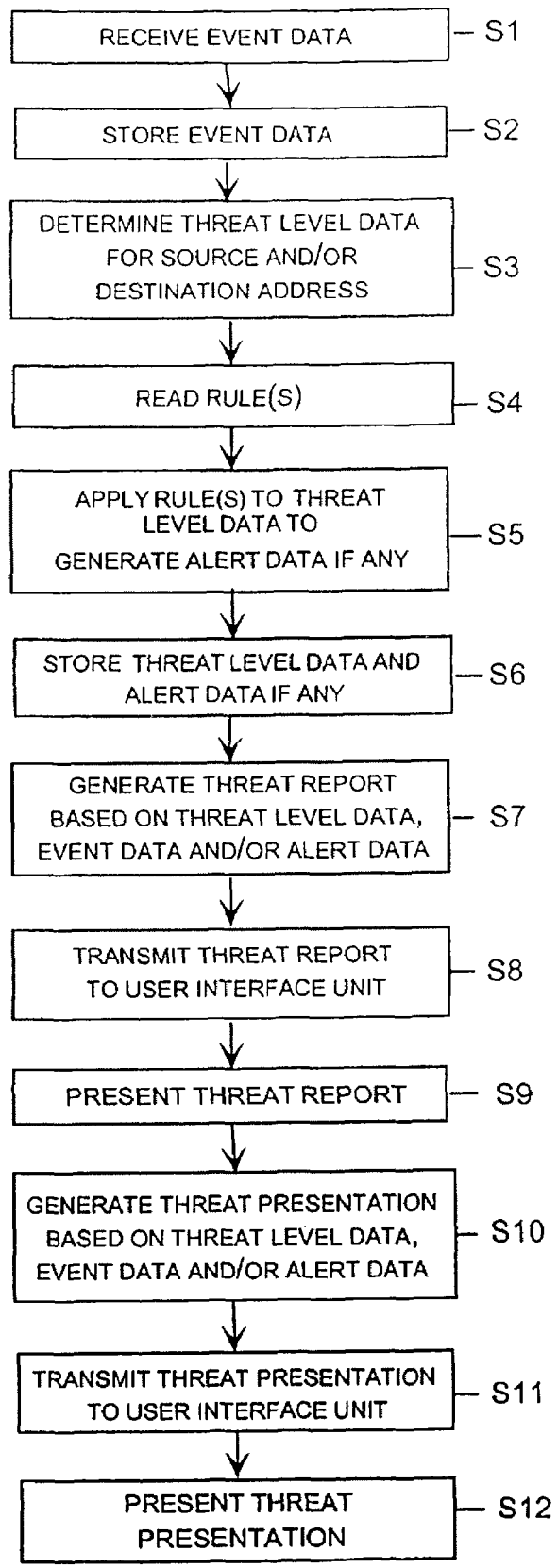
FIG. 20 is a flowchart of a general method of the invention that can be performed by the management module and the user interface unit.

FIG. 20 is a general method for generating threat level data 40 based on event data 42, and for generating a threat report 44 and/or threat presentation 45 based thereon. The method can be performed by the computing device 12 executing the management module 18, and the user interface unit 16. In step S1 the event data 38 is received from the sensor device(s) 24 by the computing device 12. In step S2 the event data 38 is stored in the memory of the computing device 12. In step S3 the computing device 12 determines the threat level data 40. In step S4 the computing device 12 reads rule(s) 41 stored in its memory. In step S5 the computing device 12 applies rule(s) 41 to the threat level data 40 to generate alert data 42. In step S6 the computing device 12 stores threat level data 40 and alert data 42 if any. In step S7 the computing device 12 generates a threat report 44 based on the threat level data 40, the event data 38 and/or the alert data 42. In step S8 the computing device 42 transmits a threat report 44 to the user interface unit 16. In step S9 the user interface unit 16 presents the threat report 44 to the user. In step S10 the computing device 12 generates a threat presentation 45 based on the threat level data 40, the event data 38 and/or the alert data 42. In step S11 the computing device 12 transmits the threat presentation 45 to the user interface unit 16. In step S12 the user interface unit 16 presents the threat presentation 45 to the user.

FIG. 21 is a method performed by the management module 18 upon execution of its event storage module 46 by the processor 150. In step S1 the processor 150 receives normalized event data 38. In step S2 the processor 150 stores the event data 38 in memory 152, or more particularly, in the database 48 and cache 50.

FIG. 22 is a method performed by the computing device 12 by execution of the threat level determination module 52 by the processor 150. In step S1 the processor 150 reads the event data 38 from the event module 12. In step S2 the processor 150 correlates the event data 38. The processor 150 can correlate the event data 38 on the basis of the source address associated with an event and/or a destination address associated with the event. In step S3 the processor 150 determines the atomic threat level data 40 for the source and/or destination address associated with the event. In step S4 the processor 150 determines the compound threat level data for the source and/or destination address. In step S5 the processor 150 reads the rule(s) 41 from the memory 152. In step S6 the processor 150 applies the rule(s) 41 to the atomic and compound threat level data 40. This action may result in the generation of alert data 42, depending upon the rule(s) 41 and value(s) of the threat level data 40. In step S7 the processor 150 stores the atomic and compound threat level data 40 in the memory 152. If the performance of step S6 results in generation of alert data 42 by the processor 150, the processor stores the alert data in the cache 54.

Figure 23:
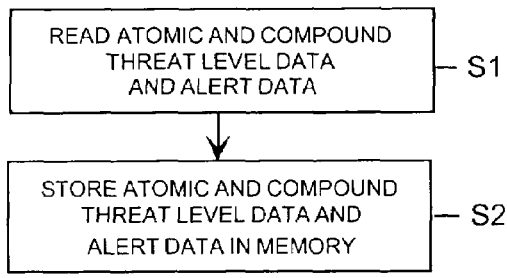
FIG. 23 is a flowchart of a method performed by the event storage module within the management module.

In step S1 of FIG. 23 the processor 150 executes the event storage module 46 to read atomic and compound threat level data 40 and any alert data 42 from the cache 54. In step S2 the processor 150 stores the threat level data 40 and any alert data 42 in the database 48.

Figure 24:
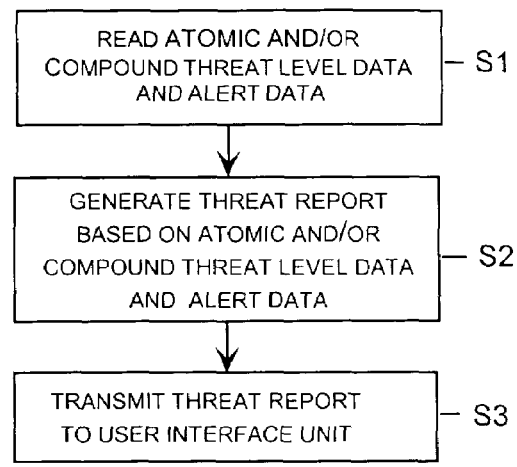
FIG. 24 is a flowchart of a method performed by the reporting module within the management module.

In step S1 of FIG. 24 the processor 150 executes the reporting module 46 to read atomic and/or compound threat level data 40 and alert data 42 from the database 48 stored in the memory 152. In step S2 the processor 150 further executes the reporting module 58 to generate a threat report 44 based on the atomic and/or compound threat level data 40 and the alert data 42. The threat report 44 can be generated for a single or multiple events. In step S3 the processor 150 transmits the threat report 44 to the user interface unit 16.

Figure 25:
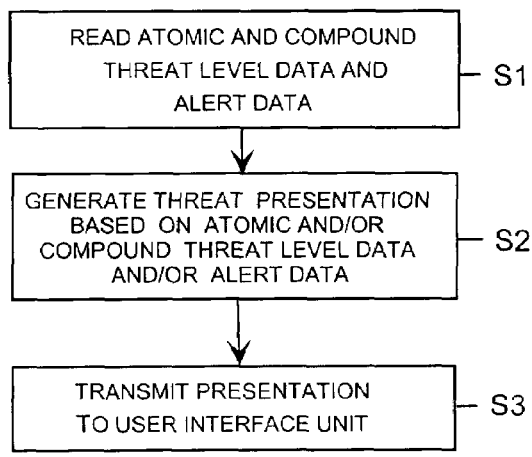
FIG. 25 is a flowchart of a method performed by the user interface module within the management module.

In FIG. 25 the processor 150 executes the user interface module 62 read atomic and compound threat level data 40 and alert data 42 from the database 48. In step S2 the processor 150 generates a threat presentation 45 based on the atomic and/or compound threat level data 40 and/or the alert data 42. In step S3 the processor 150 executes the user interface module 62 causing it to transmit the threat presentation 45 to the user interface unit 16.

FIG. 26 is a memory table of event data 38 and threat level data 40 stored in the database 48 of management module 13. For example, the memory table can be used to generate the GUI presentation of FIG. 13. The data stored in the memory table of FIG. 26 has been previously described with respect to FIG. 13, so further description will not be provided in connection with FIG. 26.

Figure 27:
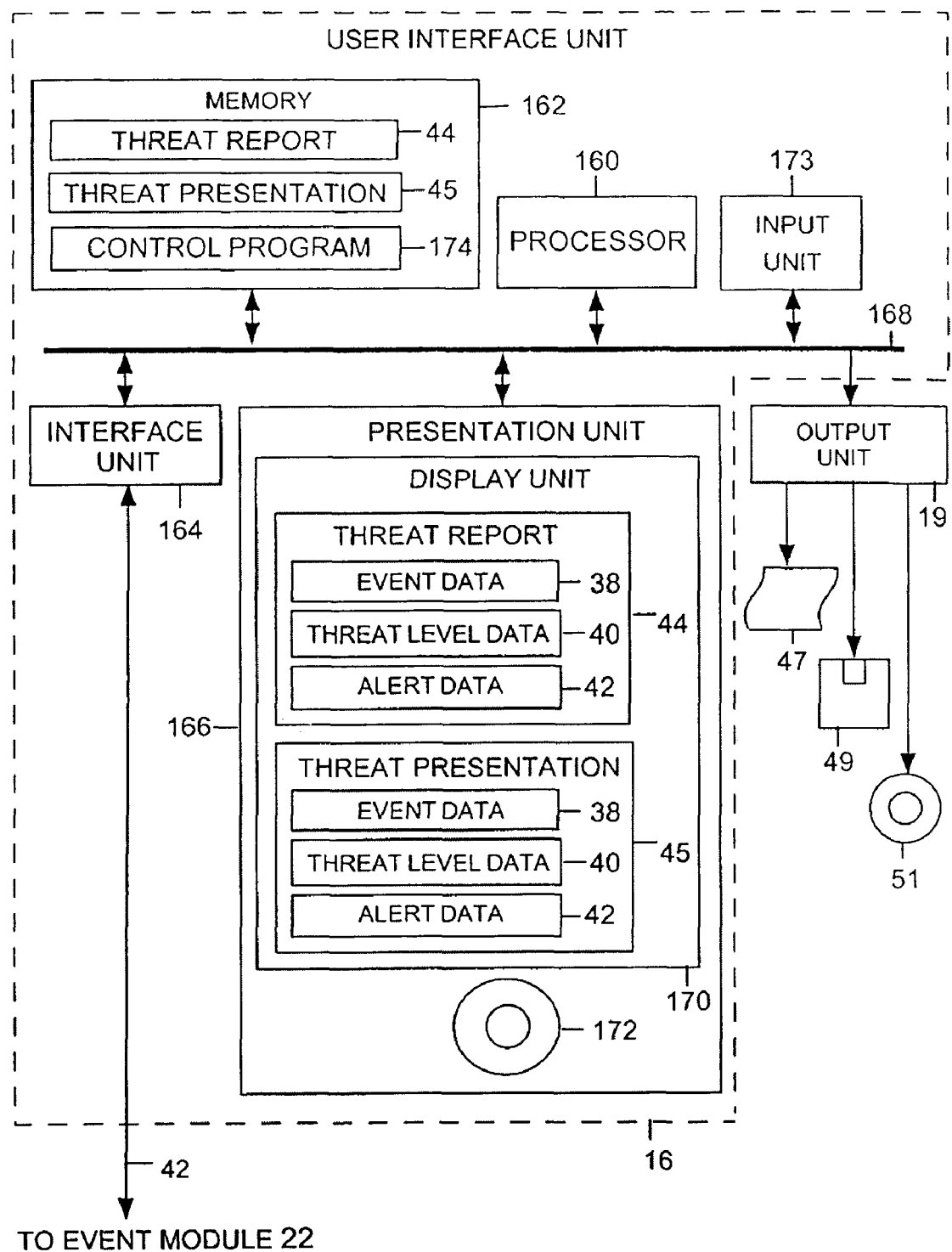
FIG. 27 is a block diagram of a user interface unit.

In FIG. 27 the user interface unit 16 comprises processor 160, memory 162, interface unit 164, and presentation unit 166, coupled via bus 168. The processor 160 executes a control program 174 stored in the memory 162 to perform the functions described hereinafter. More specifically, the processor 160 receives threat report data 44 and/or threat presentation data 45 from the management module 18 via the interface unit 164 and the bus 168. The processor 160 stores the threat report data 44 and/or the threat presentation data 45 in the memory 162. The processor 160 reads and presents the threat report data 44 and/or threat presentation data 45 on the presentation unit 166. If the threat report data 44 and/or threat presentation data 45 are visual in nature, the processor 160 renders the threat report data 44 and/or threat presentation data 45 on the display unit 170. If the threat report data 44 and/or threat presentation data 45 have audio components, the processor 160 can use such data to generate audio output to the user with the user interface unit's audio output device 172. For example, the alert data 42 may be such as to cause the processor 160 to generate an audio alarm via device 172. The user interface unit 16 can be coupled to output unit 19. The output unit 19 can be a printer in which case a user can interact with the user interface unit 16 to print the threat report 44 and/or threat presentation 45 on a paper document 47. Alternatively, the output unit 19 can be a hard-disk drive unit 19 which the user can control via the user interface unit 16 to write the threat report 44 and/or threat presentation 45 onto a diskette 49, CD-ROM 51 or other computer-readable storage medium.

Figure 28:
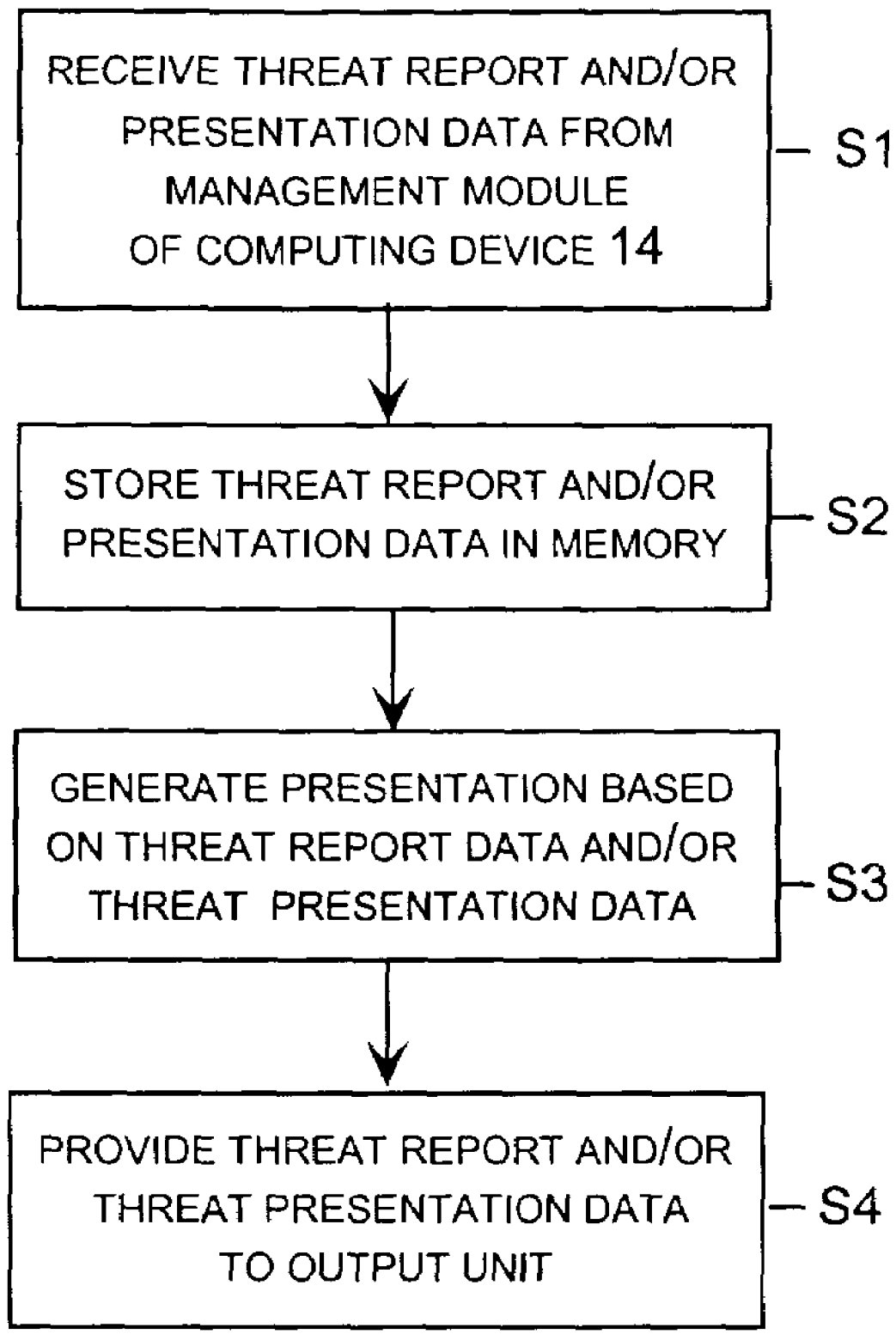
FIG. 28 is a flowchart of a method performed by the user interface unit to render a threat report and/or threat presentation.

FIG. 28 is a flowchart of a method for generating a presentation, which can be performed by the processor 160 of the computing device 16. In step S1 the processor 160 receives the threat report data 44 and/or threat presentation data 45 from the management module 18 of the computing device 14. In step S2 the processor 160 stores the threat report data 44 and/or threat presentation data 45 in the memory 162. In step S3 the processor 160 generates a presentation on the user interface unit 166 based on the threat report data 44 and/or threat presentation data 45. In step S4 the processor 160 provides the threat report 44 and/or presentation 145 to the output unit 19.

Figure 29:
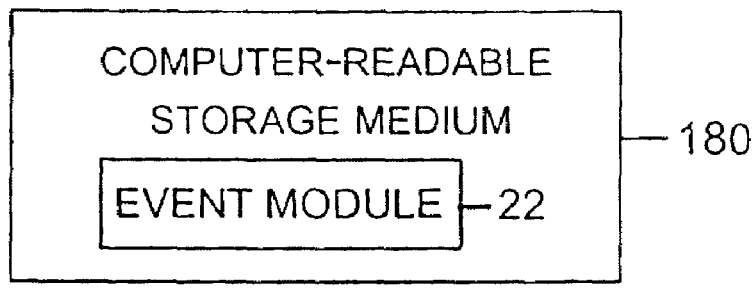
FIG. 29 is a view of a computer-readable medium for storing an event module.

In FIG. 29 a computer-readable storage medium 180 stores an event module 22 as previously described. Such computer-readable storage medium 180 can be used to load the event module 22 into a computing device 14 using a storage medium drive thereof. For example, the drive can be a diskette or tape drive commonly used by computing devices for CD-ROMs, diskettes, tapes and other storage media.

Figure 30:
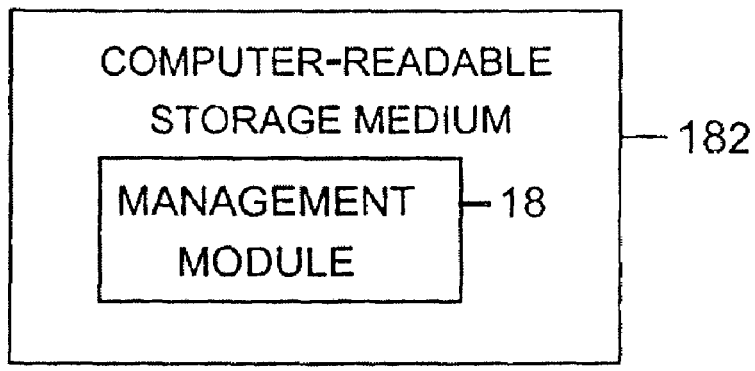
FIG. 30 is a view of a computer-readable medium for storing an event management module.

In FIG. 30 a computer-readable storage medium 182 stores a management module 18 as previously described. The computer-readable storage medium 182 can be used to load the management module 18 in the computing device 12 using a data storage medium drive thereof.

Figure 31:
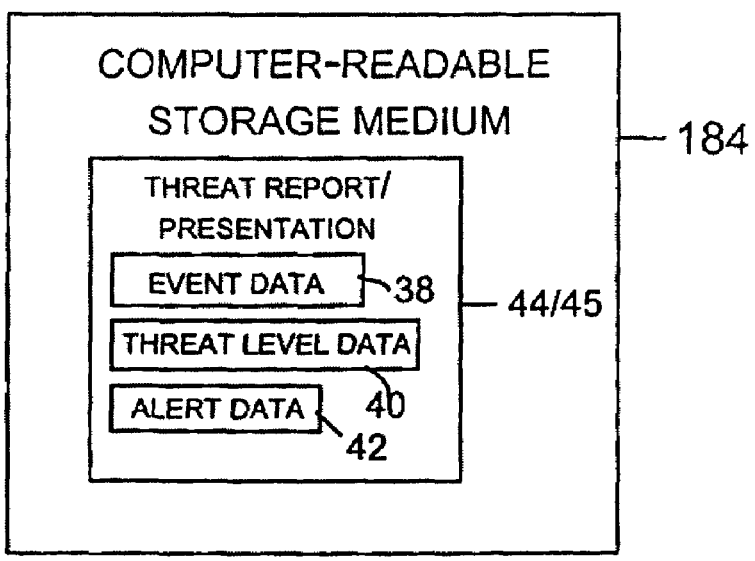
FIG. 31 is a view of a computer-readable storage medium for storing a threat report and/or threat presentation.

FIG. 31 is a computer-readable medium 184 that can be used to store event data 38, threat level data 40 and/or alert data 42. This data can be in the form of a threat report 44 and/or threat presentation 45. The computer-readable storage medium 184 can be loaded into a drive of a computing device to permit a user to view such data.

FIGS. 32A and 32B list some exemplary event types that are provided by commercially available sensor devices 24. It is well known in the art to use IDS 32 to monitor network security and usage. These sensors 36 provide event data 38 for the determination of threat levels.

FIG. 32A list a few exemplary event types provided by SNORT™, an open-source IDS 32 or commercially available from Sourcefire, Inc. As discussed, event data 38 is detected by a sensor 36 and provided to the event module 22. A partial event type listing 188a as provided by the SNORT™ IDS is provided below:

ATTACKRESPONSES_403_FORBIDDEN: detected that a webserver responded to a client with a message indicating that the client's request was not permitted.

DDOS_MSTREAM_HANDLER_TO_CLIENT: detected communication between a Distributed Denial of Service (DDOS) handler system and one of its clients.

FTP_BAD_LOGIN: detected a failed login attempt to an FTP server.

MSSQL_WORM_PROPAGATION_ATTEMPT: detected an infected MSSQL server worm attempting to propogate itself.

SCAN_NMAP_TCP: detected a TCP portscan. The scan signature is indicative that the portscan utility 'nmap' was used.

FIG. 32B list a few exemplary event types provided by ENTERASYS DRAGON™, a commercially available IDS 32 from Enterasys Networks, Inc. A partial event type listing 188b as provided by the ENTERASYS DRAGON™ IDS is provided below:

WEB:DOT-DOT: detected a web client requesting a URL with a ". ." in it. This may be indicative of a directory traversal attempt.

TCP-SWEEP: detected a TCP sweep of the network. This is indicative of a reconaissance attempt.

JOB:HOTJOBS: detected a web client connecting to the HotJobs website.

IIS:UNICODE: detected an attempt to exploit a Unicode vulnerability in Microsoft's Internet Information Server.

BACK-ORIFICE:SCAN: detected a scan for Back-Orifice infected systems. As discussed, event data 38 is detected by a sensor 36 and provided to the event module 22. Event types are included in the transmitted event data message.

FIG. 33 presents exemplary formulas utilized in the determination of threat levels. The threat level determinations are calculated by management module 18 in response to normalized event data 38 provided by the event module 22. The following formulas are utilized by the management module 22 to derive threat levels:

Threat 190

The Threat T(H) for a given host H is given by the product of the threat weighting assigned to that host and the threat weighting assigned to that host's netblock. The host's netblock is determined by looking up that value in a lookup table.

Source Threat 192

The source threat ST(E) for a given event E is determined by the Threat calculated for that event's source IP address (e.src).

Destination Threat 194

The destination threat DT(E) for a given event E is determined by the Threat calculated for that event's destination IP address (e.g. e.dst).

Vulnerability 196

The vulnerability V(E) for a given event E is determined by the event's destination threat multiplied by the vulnerability value in a lookup table indexed by the event's destination and the event's type.

Event Validity 198

The validity EV(E) for a given event E is determined by looking up the validity value in a lookup table indexed by the event's source and the event's type.

Event Severity 200

The severity ES(E) for a given event E is determined by looking up the priority value in a lookup table indexed by various aspects of an event.

Atomic Threat 202

The atomic threat AT(E) for a given event E is the product of the validity of the event, the vulnerability of the event, the source threat of the event, and the severity of the event.

The Host Threat 204

The function $\delta(E,H,t)$ is a step function for a given event E, host H, and time period t, whose value is 1 if and only if the time associated with the event is between 0 and the given time period and either the event's source or the event's destination corresponds to the given host.

The host threat HT(H,t) for a given host H and time period t is calculated as the summation for all events received of the atomic threats for each event times the step function for each event, the given host, and the given time period, divided by the summation for all events received of the step function for each event, the given host, and the given time period. Thus, the host threat HT(H,t) is the weighted average for a particular host for time of all of the atomic threats received by the system.

Differential Threat Level 206

The Compound or Differential Threat Level DTL(H,t1,t2) for a given host H and two time periods t1 and t2, such that t1 is strictly greater than zero and strictly less than or equal to t2, is represented by the multiplication of the host threat for the given host over time period t1 multiplied the time period t2, divided by the multiplication of the host threat for the given host over time period t2 multiplied by the time period t1.

Those skilled in the art will acknowledge that numerous variations of the above mathematical formulas can be formulated to express the same functionality.

Figure 34:
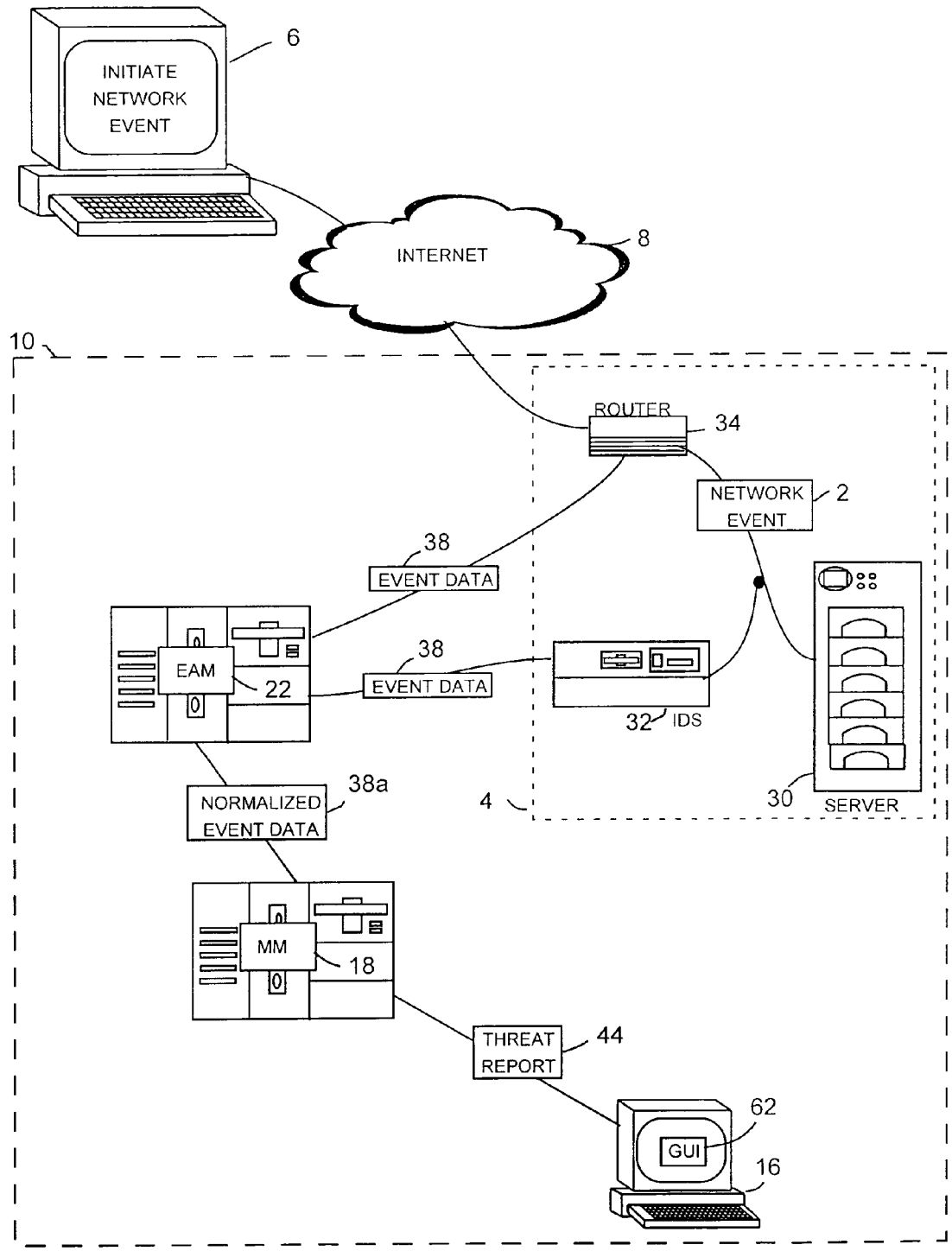
FIG. 34 illustrates an exemplary scenario of the performance of a threat calculation in accordance with an embodiment of the present invention.

FIG. 34 illustrates an exemplary scenario of the performance of a threat calculation in accordance with an embodiment of the present invention. Computer networks 4 contain vulnerabilities that can be exploited from remote locations 6 on a network. Commercial products exist, such as an IDS 32, that monitor network traffic and attempt to detect when such vulnerabilities are being exploited. The present system 10 monitors IDS devices 32 as well as other sensors 36 such as firewalls 28, routers 34, servers 30 and other network devices 24 in order to determine threat levels to the network 4. The threat levels are determined by aggregating all event data 38 generated by the monitored devices and provide and provide a threat ranking of all activity on the network 4.

As illustrated, a remote system 6 has targeted for an attack a monitored network 4 via the Internet 8. The network event 2 is detected by the IDS 32 and forwards event data to the event aggregation module (EAM) 22. The EAM 22 intetprets the event, determines an event type originating from the source bost 6 and targeting the destination server 30, and forwards normalized to the management module (MM) 18 where the threat calculations are performed.

In order to determine threat levels, information is retrieved from the system database regarding the event e, the source src, and the destination dst:
- a. Source Host Threat Weighting for src (src(TW)
- b. Source Netblock Threat Weighting for src (srcNBTW)
- c. Destination Host Threat Weighting for dst (dstTW)
- d. Destination Netblock Threat Weighting for dst (dstNBTW)
- e. Vulnerability of Destination dst to event_type e (dstVuln)
- f. Event Priority for event_type (severity)
- g. Event Validity for event_validilty (validity)

The Atomic Threat Level (ATV) for the event e is then calculated based upon the weighting factors. The calculation is performed for src, dst, and for the event e:

scrATV=srcTW* srcNBTW
dstATV=dstVuln* dstTW* dstNBTW
eventATV=scrATV* dstATV* severity* validity A threat report 44 transmits the Atomic Threat Levels to a user interface device 16 and is the associated values are displayed by the graphical unit interface 62.

The A compound threat calculation operates over a time period t1, defined as the time range between the current time and t1 seconds ago, and a time period t2, which a time range greater than t1. The compound threat is calculated by summing the eventATV values for the host within time period t1, divided by the counts of events of the host in time t1. A differential threat level value can also be determined. A threat report 44 transmits the these Threat Levels to a user interface device 16 and displayed by the graphical unit interface 62.

The many features and advantages of the present invention are apparent from the detailed specification and thus, it is intended by the appended claims to cover all such features and advantages of the described methods, apparatuses, system, and articles which follow in the true spirit and scope of the invention. Further, since numerous modifications and changes will readily occur to those of ordinary skill in the art it is not desired to limit the invention to the exact construction and operation illustrated and described. Accordingly, all suitable modifications and equivalents may be resorted to as falling within the scope of the invention.

The invention claimed:

1. A computer-implemented method for determining network security threat level, comprising:
   receiving event data in response to identified network event detected by a sensor;
   based upon the event data:
      determining a source threat value, the source threat value based upon a source threat weight for a source IP address and a first range of IP network addresses of which the source IP address is a member;
      determining a destination vulnerability value, the destination vulnerability value based upon the network event in conjunction with a destination IP address, a destination threat weight for the destination IP address, and a threat level value associated with a second range of network IP address of which the destination IP address is a member;

determining an event validity value based upon the source IP address and an event type;

determining event severity value based upon the event type;

calculating an event threat level value based upon the source threat value, the destination vulnerability value, the event validity value, and the event severity value;

calculating a host threat level value based upon a summation of event threat level values for a host over a first time period associated with a number of correlated events for the host in the first time period;

calculating a differential threat level by associating the host threat level value with a second host threat level value based upon a second time period wherein the second time period exceeds the first time period;

generating at least one of: a threat report and a threat presentation based at least on the calculated threat levels; and outputting the at least one of: threat report and threat presentation.

2. The method of claim 1, further comprising the steps of:
comparing the event threat level value to an event alert value; and
generating an alarm when the event threat level value exceeds the event alert value.

3. The method of claim 1, further comprising the steps of:
comparing the host threat level value to a host alert value; and
generating an alarm when the host threat level value exceeds the host alert value.

4. The method of claim 1, further comprising the steps of:
comparing the differential threat level value to a differential alert value; and
generating an alarm when the differential threat level value exceeds the differential alert value.

5. A method for determining network security threat level, comprising:
receiving event data in response to an identified network event detected by a sensor;
determining an event type based upon the event data; and
determining a source threat based upon a source threat weighting assigned to a source for the event type associated with a network block threat weighting for the event type assigned to a host network block of which the host is a member;
determining a destination threat value based upon a destination threat weighting assigned to the destination for the event type associated with a network block threat weighting for the event type assigned to a host network block of which the host is a member;
determining a destination vulnerability by associating the destination threat value with a destination vulnerability value based upon a vulnerability of a destination host for the event type;
determining an event validity based upon the source and the event type;
determining an event severity based upon the event type;
calculating the network security threat based upon the source threat, the destination vulnerability, the event validity, and the event severity;
generating at least one of: a threat report and a threat presentation based at least on the calculated network security threat; and outputting the at least one of: threat report and threat presentation.

6. A method for determining network security threat level, comprising:
receiving event data in response to an identified network event detected by a sensor;
determining an event type based upon the event data;
determining a source threat based upon a source threat weighting assigned to a source for the event type associated with a network block threat weighting for the event type assigned to a host network block of which the host is a member;
determining a destination threat value based upon a destination threat weighting assigned to the destination for the event type associated with a network block threat weighting for the event type assigned to a host network block of which the host is a member;
determining a destination vulnerability by associating the destination threat value with a destination vulnerability value based upon a vulnerability of a. destination host for the event type;
determining an event validity based upon the source and the event type;
determining an event severity base upon the event type;
calculating an event threat based upon the source threat, the destination vulnerability, the event validity, and the event severity;
calculating a compound host threat by associating a plurality of event threats over a time period with a number of correlated events in the time period;
generating at least one of: a threat report and a threat presentation based at least on the calculated threat levels; and
outputting the at least one of: threat report and threat presentation.

7. A method for determining network security threat level, comprising:
receiving event data in response to an identified network event detected by a sensor;
determining an event type based upon the event data;
determining a source threat based upon a source threat weighting assigned to a source for the event type associated with a network block threat weighting for the event type assigned to a host network block of which the host is a member;
determining a destination threat value based upon a destination threat weighting assigned to the destination for the event type associated with a network block threat weighting for the event type assigned to a host network block of which the host is a member;
determining a destination vulnerability by associating the destination threat value with a destination vulnerability value based upon a vulnerability of a destination host for the event type;
determining an event validity based upon the source and the event type;
determining an event severity base upon the event type;
determining an event threat based upon the source threat, the destination vulnerability, the event validity, and the event severity;
determining a first compound host threat value by associating a first plurality of event threats over a first time period with a first frequency number of correlated events in the first time period;
determining a second compound host threat value by associating a second plurality of event threats over a second time period greater than the first time period with a second frequency number of correlated events in the second time period;

determining a differential threat level by associating the first compound host threat value with the second host threat value;

generating at least one of: a threat report and a threat presentation based at least on the calculated threat levels; and outputting the at least one of: threat report and threat presentation.

8. A method for determining network security threat level, comprising:

receiving event data in response to an identified network event detected by a sensor;

determining an event type based upon the event data;

based upon the event data, perform the following steps:

determining a first host frequency threat level value by summing event threat level values for a host over a first time period dividing by the number of correlated events for the host in the first time period;

determining a second host frequency threat level value by summing event threat level values for the host over a second time period greater than the first time period and associated with the number of correlated events for the host in the second time period;

determining a differential threat level numerator by multiplication of the first host frequency threat level value by the second time period;

determining a differential threat level denominator by multiplying the second host frequency value by the first time period, and calculating a differential threat level by dividing the differential threat level numerator by the differential threat level denominator;

generating at least one of: a threat report and a threat presentation based at least on the calculated differential threat level; and outputting the at least one of: threat report and threat presentation.

* * * * *